US00RE51041E

(19) United States
(12) Reissued Patent
Kashyap et al.

(10) Patent Number: US RE51,041 E
(45) Date of Reissued Patent: Sep. 22, 2026

(54) DEVICE PAIRING

(71) Applicant: SAMSUNG ELECTRONICS CO., LTD., Suwon-si (KR)

(72) Inventors: Praveen Kashyap, Irvine, CA (US); Can Gurbag, Irvine, CA (US); Esther Zheng, Irvine, CA (US); Jason Meachum, Mission Viejo, CA (US); Michael Bringle, Irvine, CA (US)

(73) Assignee: SAMSUNG ELECTRONICS CO., LTD., Suwon-si (KR)

(21) Appl. No.: 18/584,886

(22) Filed: Feb. 22, 2024

Related U.S. Patent Documents

Reissue of:
(64) Patent No.: 11,259,064
Issued: Feb. 22, 2022
Appl. No.: 16/676,266
Filed: Nov. 6, 2019

U.S. Applications:
(63) Continuation of application No. 15/867,258, filed on Jan. 10, 2018, now Pat. No. 10,516,910, which is a
(Continued)

(51) Int. Cl.
*H04N 21/41* (2011.01)
*G06K 9/00* (2022.01)
(Continued)

(52) U.S. Cl.
CPC ..... *H04N 21/41265* (2020.08); *G06V 40/172* (2022.01); *H04H 60/56* (2013.01);
(Continued)

(58) Field of Classification Search
CPC ..... H04N 21/44008; H04N 21/25816; H04N 21/44218; H04N 21/4126; H04N 21/4108;
(Continued)

(56) References Cited

U.S. PATENT DOCUMENTS 7,474,315 B1 1/2009 Hendry
7,650,445 B2 1/2010 Ma et al.
(Continued)

OTHER PUBLICATIONS

McCune, J.M., "Seeing-Is-Believing: Using Camera Phones for Human-Verifiable Authentication", A Thesis Submitted in Particial Fullfullment of the Requirments for the Degree Master of Science, May 2005, pp. 1-46, Electrical and Computer Engineering, Carnegie Mellon University, Pennsylvania, United States.
(Continued)

*Primary Examiner* — Matthew E Heneghan
(74) *Attorney, Agent, or Firm* — Sughrue Mion, PLLC

(57) ABSTRACT

A method for wirelessly connecting a first device with an external second device includes wirelessly communicating between the first device and the external second device. Based on the wireless communication, the first device causes displaying of a dynamic graphic pattern on a display of the external second device. The dynamic graphic pattern having a shape that changes over time. A camera of the first device receives the dynamic graphic pattern. The first device recognizes the dynamic graphic pattern associated with the external second device. Data is wirelessly transferred between the first device and the external second device based on the recognized dynamic graphic pattern.

16 Claims, 19 Drawing Sheets

Related U.S. Application Data continuation of application No. 15/171,100, filed on Jun. 2, 2016, now Pat. No. 9,948,974, which is a continuation of application No. 14/102,612, filed on Dec. 11, 2013, now Pat. No. 9,361,541.

(51) Int. Cl.

| | |
|---|---|
| ***G06K 9/62*** | (2022.01) |
| ***G06K 9/78*** | (2006.01) |
| ***G06V 40/16*** | (2022.01) |
| ***H04H 60/56*** | (2008.01) |
| ***H04N 21/258*** | (2011.01) |
| ***H04N 21/2668*** | (2011.01) |
| ***H04N 21/414*** | (2011.01) |
| ***H04N 21/4223*** | (2011.01) |
| ***H04N 21/436*** | (2011.01) |
| ***H04N 21/4363*** | (2011.01) |
| ***H04N 21/44*** | (2011.01) |
| ***H04N 21/441*** | (2011.01) |
| ***H04N 21/442*** | (2011.01) |
| ***H04W 76/11*** | (2018.01) |

(52) U.S. Cl.

CPC ... *H04N 21/25816* (2013.01); *H04N 21/2668* (2013.01); *H04N 21/4108* (2013.01); *H04N 21/4122* (2013.01); *H04N 21/4126* (2013.01); *H04N 21/41407* (2013.01); *H04N 21/4223* (2013.01); *H04N 21/43615* (2013.01); *H04N 21/43637* (2013.01); *H04N 21/44008* (2013.01); *H04N 21/441* (2013.01); *H04N 21/44218* (2013.01); *H04W 76/11* (2018.02); *G06V 40/16* (2022.01)

(58) Field of Classification Search

CPC ..... H04N 21/441; H04N 21/41407; H04N 21/2668; H04N 21/43637; H04N 21/4223; H04N 21/4122; H04N 21/43615; H04N 21/41265; H04H 60/56; G06V 40/172; G06V 40/16; H04W 76/11; G06F 21/36

See application file for complete search history.

(56) References Cited

U.S. PATENT DOCUMENTS

| | | | | |
|---|---|---|---|---|
| 8,364,389 | B2 | 1/2013 | Dorogusker et al. | |
| 8,552,881 | B2 | 10/2013 | Nylund | |
| 8,610,836 | B2 | 12/2013 | Chuang et al. | |
| 8,611,601 | B2 * | 12/2013 | Calman | G06K 9/00221 382/103 |
| 8,630,586 | B2 | 1/2014 | Dvortsov et al. | |
| 8,886,953 | B1 * | 11/2014 | Sipe | G06K 9/00221 713/186 |
| 8,902,320 | B2 | 12/2014 | Jung et al. | |
| 9,001,215 | B2 | 4/2015 | Jung et al. | |
| 9,022,291 | B1 | 5/2015 | Van Der Merwe | |
| 9,083,658 | B2 | 7/2015 | Hawver et al. | |
| 9,110,554 | B2 | 8/2015 | Horsman et al. | |
| 9,124,729 | B2 | 9/2015 | Jung et al. | |
| 9,230,303 | B2 | 1/2016 | Kanaev et al. | |
| 2006/0174206 | A1 | 8/2006 | Jung et al. | |
| 2008/0106621 | A1 | 5/2008 | Jung et al. | |
| 2008/0219589 | A1 | 9/2008 | Jung et al. | |
| 2009/0002379 | A1 | 1/2009 | Baeza et al. | |
| 2009/0195402 | A1 | 8/2009 | Izadi et al. | |
| 2010/0198453 | A1 | 8/2010 | Dorogusker et al. | |
| 2010/0303437 | A1 | 12/2010 | Leichsenring et al. | |
| 2011/0159814 | A1 | 6/2011 | Mallinson et al. | |
| 2011/0252090 | A1 | 10/2011 | Garcia et al. | |
| 2011/0271295 | A1 * | 11/2011 | Redmann | H04N 21/23418 725/13 |
| 2011/0314153 | A1 | 12/2011 | Bathiche et al. | |
| 2012/0159340 | A1 | 6/2012 | Bae et al. | |
| 2012/0200419 | A1 | 8/2012 | Nylund | |
| 2012/0242852 | A1 | 9/2012 | Hayward et al. | |
| 2012/0278764 | A1 | 11/2012 | Arriola et al. | |
| 2013/0144464 | A1 | 6/2013 | Dorogusker et al. | |
| 2013/0222627 | A1 | 8/2013 | Earnshaw et al. | |
| 2013/0329114 | A1 | 12/2013 | Kim et al. | |
| 2014/0013100 | A1 | 1/2014 | Menzel et al. | |
| 2014/0013236 | A1 | 1/2014 | Horsman et al. | |
| 2014/0125483 | A1 | 5/2014 | Kane et al. | |
| 2014/0282718 | A1 | 9/2014 | Jacoby | |
| 2015/0046559 | A1 | 2/2015 | Shariff et al. | |
| 2016/0087967 | A1 * | 3/2016 | Pang | H04W 76/11 726/6 |
| 2016/0165570 | A1 | 6/2016 | Kim et al. | |
| 2016/0283699 | A1 * | 9/2016 | Levin | G06F 21/44 |
| 2018/0070291 | A1 | 3/2018 | Breaux et al. | |
| 2021/0012092 | A1 * | 1/2021 | Purves | G06K 9/2027 |

OTHER PUBLICATIONS

U.S. Non-Final Office Action for U.S. Appl. No. 14/225,353 (SAM2C-P.e38.A) mailed Aug. 12, 2015.
U.S. Non-Final Office Action for U.S. Appl. No. 14/102,612 (SAM2C-P e38) mailed Jun. 23, 2015.
U.S. Final Office Action for U.S. Appl. No. 14/102,612 (SAM2C-P e38) mailed Nov. 9, 2015.
U.S. Notice of Allowance for U.S. Appl. No. 14/102,612 (SAM2C-P e38) mailed Feb. 9, 2016.
U.S. Notice of Allowance for U.S. Appl. No. 14/225,353(SAM2C-P e38) mailed Jan. 7, 2016.
U.S. Non-Final Office Action for U.S. Appl. No. 15/171,100 (SAM2C-P e38) mailed Sep. 30, 2016.
U.S. Final Office Action for U.S. Appl. No. 15/171,100 (SAM2C-P e38) mailed Mar. 14, 2017.
U.S. Advisory Action for U.S. Appl. No. 15/171,100 (SAM2C-P e38) mailed May 24, 2017.
U.S. Non-Final Office Action for U.S. Appl. No. 15/171,100 (SAM2C-P e38) mailed Jul. 6, 2017.
U.S. Notice of Allowance for U.S. Appl. No. 15/171,100 (SAM2C-P e38) mailed Dec. 7, 2017.
U.S. Non-Final Office Action for U.S. Appl. No. 15/867,258 (SAM2C-P e38) mailed Aug. 7, 2018.
U.S. Notice of Allowance for U.S. Appl. No. 15/867,258 (SAM2C-P e38) mailed Dec. 20, 2018.
U.S. Non-Final Office Action for U.S. Appl. No. 15/867,258 (SAM2C-P e38) mailed Apr. 10, 2019.
U.S. Notice of Allowance for U.S. Appl. No. 15/867,258 (SAM2C-P e38) mailed Aug. 2, 2019.

* cited by examiner

DEVICE PAIRING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This is a reissue application of U.S. Pat. No. 11,259,064, which was filed as U.S. patent application Ser. No. 16/676,266 on Nov. 6, 2019, and issued on Feb. 22, 2022, and which is a continuation application of U.S. patent application Ser. No. 15/867,258, filed Jan. 10, 2018, now U.S. Pat. No. 10,516,910, issued on Dec. 24, 2019, which is a continuation application of U.S. patent application Ser. No. 15/171,100, filed Jun. 2, 2016, now U.S. Pat. No. 9,948,974, issued on Apr. 17, 2018, which is a continuation application of U.S. patent application Ser. No. 14/102,612, filed on Dec. 11, 2013, now U.S. Pat. No. 9,361,541, issued Jun. 7, 2016, the disclosures of which are incorporated herein by reference in their entirety.*

CROSS-REFERENCE TO RELATED APPLICATIONS

This application is a continuation application of U.S. patent application Ser. No. 15/867,258, filed Jan. 10, 2018, which is a continuation application of U.S. patent application Ser. No. 15/171,100, filed Jun. 2, 2016, that is now U.S. Pat. No. 9,948,974, which is a continuation application of U.S. patent application Ser. No. 14/102,612, filed Dec. 11, 2013, that is now U.S. Pat. No. 9,361,541, which are each incorporated herein by reference in their entirety.

TECHNICAL FIELD

One or more embodiments relate generally to device pairing and, in particular, to automated pairing between multiple devices.

BACKGROUND

For pairing a hand-held (HH) device to a television device (TV) within a home (assuming that both of devices are using the same access point (AP)), typically the HH device presents a user with a list of all TV devices on the home network. The user would then have to select one of the devices in the list. The TV devices, however, do not know which user is currently in front of a particular TV device.

SUMMARY

Some embodiments provide a method for wirelessly connecting a first device with an external second device includes wirelessly communicating between the first device and the external second device. Based on the wireless communication, the first device causes displaying of a dynamic graphic pattern on a display of the external second device. The dynamic graphic pattern having a shape that changes over time. A camera of the first device receives the dynamic graphic pattern. The first device recognizes the dynamic graphic pattern associated with the external second device. Data is wirelessly transferred between the first device and the external second device based on the recognized dynamic graphic pattern.

Some embodiments provide a first electronic device that includes a processor and a memory storing one or more programs for execution of the processor. The one or more programs including instructions to wirelessly communicate with an external second device; based on the wireless communication, cause a dynamic graphic pattern to be displayed on a display of the external second device, the dynamic graphic pattern having a shape that changes over time; receive, by a camera of the first electronic device, the dynamic graphic pattern; recognize the dynamic graphic pattern associated with the external second device; and wirelessly transfer data between the first electronic device and the external second device based on the recognized dynamic graphic pattern.

Some embodiments provide a non-transitory processor-readable medium that includes a program that when executed by a processor performs a method comprising: wirelessly communicating between the first device and the external second device. Based on the wireless communication, the first device causing a dynamic graphic pattern to be displayed on a display of the external second device. The dynamic graphic pattern having a shape that changes over time. A camera of the first device receives the dynamic graphic pattern. The first device recognizes the dynamic graphic pattern associated with the external second device. Data is wirelessly transferred between the first device and the external second device based on the recognized dynamic graphic pattern.

These and other aspects and advantages of the embodiments will become apparent from the following detailed description, which, when taken in conjunction with the drawings, illustrate by way of example the principles of the embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

The following description is made for the purpose of illustrating the general principles of the embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments of relate generally to device and facial pairing. In one embodiment, a method for wirelessly connecting a first device with an external second device includes wirelessly communicating between the first device and the external second device. Based on the wireless communication, the first device causes displaying of a dynamic graphic pattern on a display of the external second device. The dynamic graphic pattern having a shape that changes over time. A camera of the first device receives the dynamic graphic pattern. The first device recognizes the dynamic graphic pattern associated with the external second device. Data is wirelessly transferred between the first device and the external second device based on the recognized dynamic graphic pattern.

In one embodiment, the electronic devices comprise one or more mobile electronic devices capable of data communication over a communication link such as a wireless communication link. Examples of such mobile device include a mobile phone or smart phone device, a mobile tablet device, a wearable device, a mobile computing device, etc.

Figure 1:
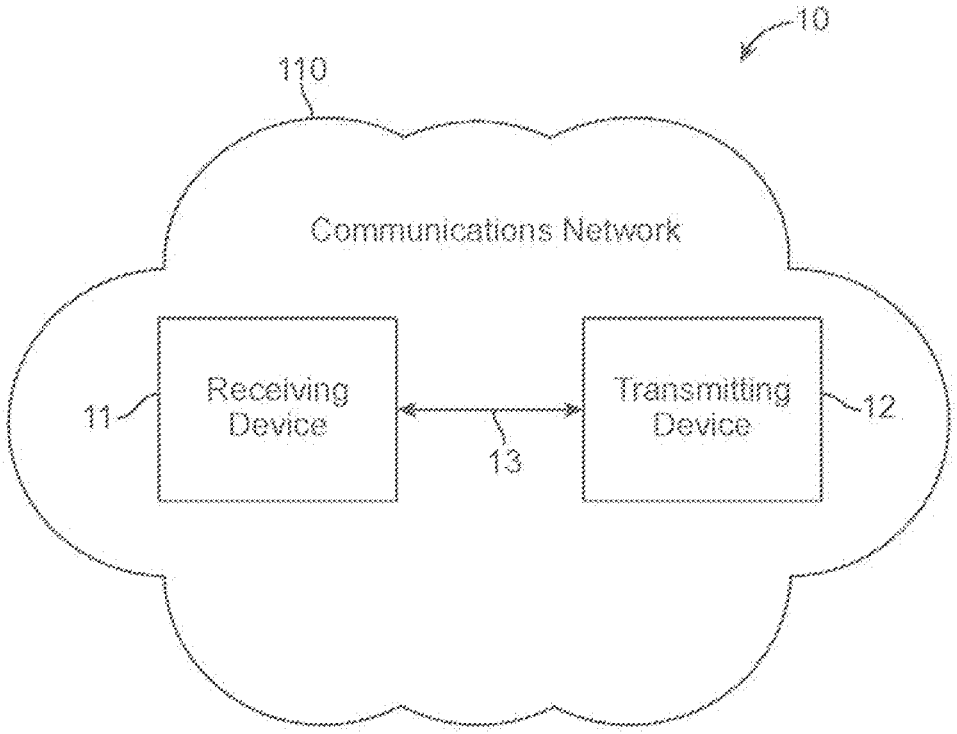
FIG. 1 shows a schematic view of a communications system, according to an embodiment.

FIG. 1 is a schematic view of a communications system in accordance with one embodiment. Communications system 10 may include a communications device that initiates an outgoing communications operation (transmitting/initiator device 12) and communications network 110, which transmitting device 12 may use to initiate and conduct communications operations with other communications devices within communications network 110. For example, communications system 10 may include a communication device that receives the communications operation from the transmitting device 12 (receiving device/listener 11). Although communications system 10 may include several transmitting devices 12 and receiving devices 11, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., a 802.11 protocol), BLUETOOTH®, high frequency systems (e.g., 900 MHz, 2.4 GHz, and 5.6 GHz communication systems), infrared, other relatively localized wireless communication protocol, or any combination thereof. In some embodiments, communications network 110 may support protocols used by wireless and cellular phones and personal email devices (e.g., a) BLACKBERRY®). Such protocols can include, for example, GSM, GSM plus EDGE, CDMA, quadband, and other cellular protocols. In another example, a long-range communications protocol can include Wi-Fi and protocols for placing or receiving calls using VOIP or LAN. Transmitting device 12 and receiving device 11, when located within communications network 110, may communicate over a bidirectional communication path such as path 13. Both transmitting device 12 and receiving device 11 may be capable of initiating a communications operation and receiving an initiated communications operation.

Transmitting device 12 and receiving device 11 may include any suitable device for sending and receiving communications operations. For example, transmitting device 12 and receiving device 11 may include a media player, a cellular telephone or a landline telephone, a personal e-mail or messaging device with audio and/or video capabilities, pocket-sized personal computers such as an iPAQ Pocket PC available by Hewlett Packard Inc., of Palo Alto, Calif., personal digital assistants (PDAs), a desktop computer, a laptop computer, and any other device capable of communicating wirelessly (with or without the aid of a wireless enabling accessory system) or via wired pathways (e.g., using traditional telephone wires). The communications operations may include any suitable form of communications, including for example, voice communications (e.g., telephone calls), data communications (e.g., e-mails, text messages, media messages), or combinations of these (e.g., video conferences).

Figure 2:
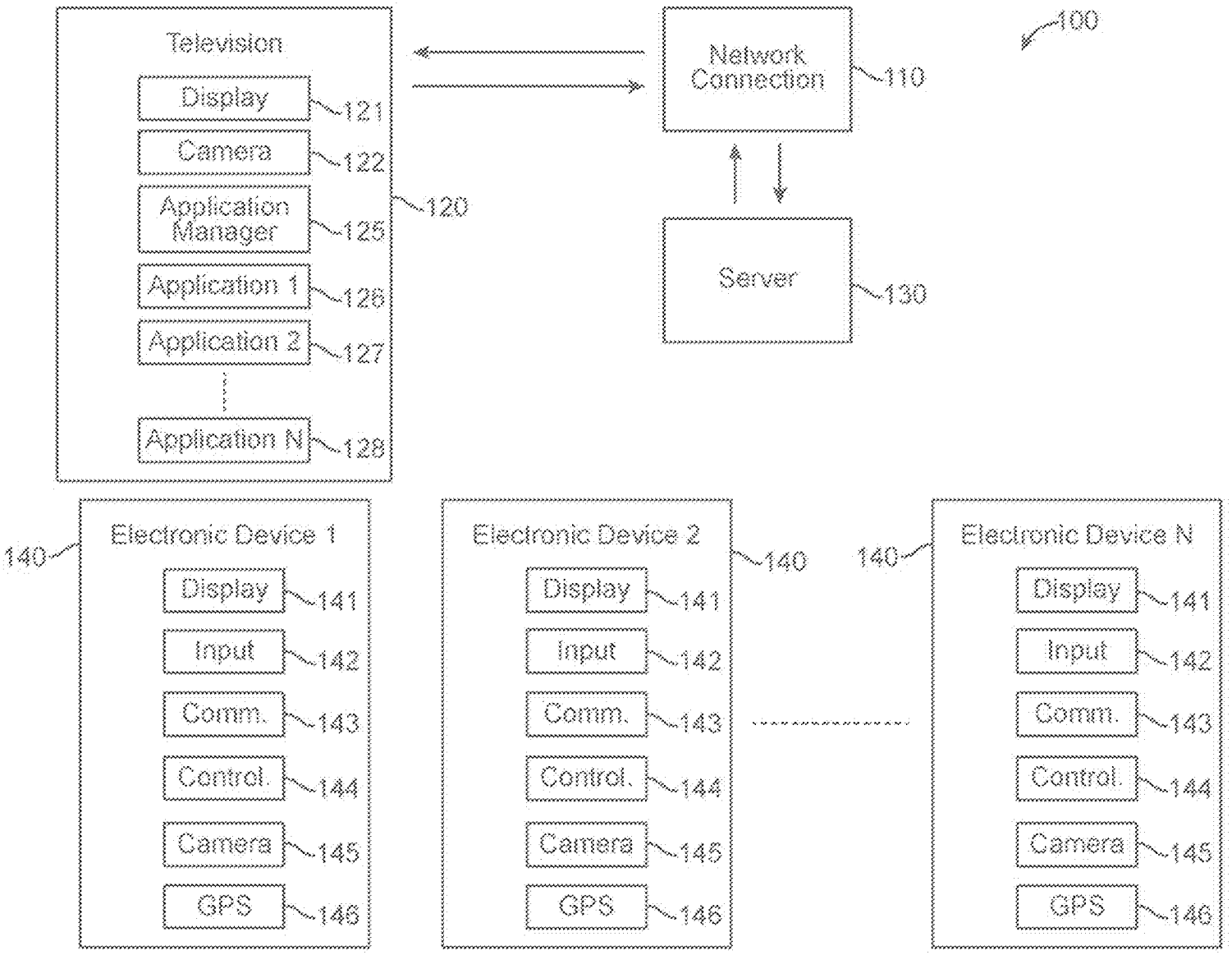
FIG. 2 shows a block diagram of an architecture for a system for device pairing, according to an embodiment.

FIG. 2 shows a functional block diagram of an embodiment of an architecture system 100 for application connection by hand held (HH) electronic devices 1-N 140 (N being a positive integer), according to an embodiment. In one embodiment, the system 100 comprises a television device 120 (e.g., a TV, a computer, tablet, etc.), a cloud or server device 130 and network connection device 110. In one embodiment, the television device 120 comprises a display 121, a camera or imaging device 122 (either integrated with the TV 120 or separate from the TV 120), and an application manager module 125 for managing applications, such as application 1126, application 2127 up to application N 128, N being a positive integer.

In one embodiment, the display 121 may be a separate device from the television device 120 or integrated with the television device 120. In one embodiment, the camera 122 may be a separate device from the television device 120 or integrated with the television device 120. In one embodiment, the network connection device 110 may comprise a network interface, such as a network modem, router, etc. for handling communications between the television device and the server device 130 and for forming a local network that the television device 120 may be connected with.

In one embodiment, both transmitting device 12 and receiving device 11 may include some or all of the features of electronics devices 1-N 140. In one embodiment, the electronic devices 1-N 140 may comprise a display 141, input mechanism 142, communications circuitry 143, control circuitry 144, a camera 145, and a global positioning system (GPS) receiver module 146, a microphone, audio output, and any other suitable components.

In one embodiment, all of the applications employed by display 141, input mechanism 142, the audio output and communications circuitry 143 may be interconnected and managed by control circuitry 144. In one example, a handheld music player capable of transmitting music to other tuning devices may be incorporated into the electronics devices 1-N 140.

In one embodiment, the audio output may include any suitable audio component for providing audio to a user of any of the electronics devices 1-N 140. For example, the audio output may include one or more speakers (e.g., mono or stereo speakers) built into an electronics device 1-N 140. In some embodiments, the audio output may include an audio component that is remotely coupled to an electronics device 1-N 140. For example, the audio output may include a headset, headphones or earbuds that may be coupled to communications device with a wire (e.g., coupled to an electronics device 1-N 150 with a jack) or wirelessly (e.g., BLUETOOTH® headphones or a BLUETOOTH® headset).

In one embodiment, display 141 may include any suitable screen or projection system for providing a display visible to the user. For example, display 141 may include a screen (e.g., an LCD screen) that is incorporated in an electronics device 1-N 140. As another example, display 141 may include a movable display or a projecting system for providing a display of content on a surface remote from an electronics device 1-N 140 (e.g., a video projector). Display 141 may be operative to display content (e.g., information regarding communications operations or information regarding available media selections) under the direction of control circuitry 144.

In one embodiment, input mechanism 142 may be any suitable mechanism or user interface for providing user inputs or instructions to an electronics device 1-N 140. Input mechanism 142 may take a variety of forms, such as a button, keypad, dial, a click wheel, or a touch screen. The input mechanism 142 may include a multi-touch screen. The input mechanism may include a user interface that may emulate a rotary phone or a multi-button keypad, which may be implemented on a touch screen or the combination of a click wheel or other user input device and a screen.

In one embodiment, communications circuitry 143 may be any suitable communications circuitry operative to connect to a communications network (e.g., communications network 110, FIG. 1) and to transmit communications operations and media from an electronics device 1-N 140 to other devices within the communications network. Communications circuitry 143 may be operative to interface with the communications network using any suitable communications protocol such as, for example, Wi-Fi (e.g., an 802.11 protocol), BLUETOOTH®, high frequency systems (e.g., 900 MHz, 2.4 GHz, and 5.6 GHz communication systems), infrared, GSM, GSM plus EDGE, CDMA, quadband, and other cellular protocols, VOIP, or any other suitable protocol.

In some embodiments, communications circuitry 143 may be operative to create a communications network using any suitable communications protocol. For example, communications circuitry 143 may create a short-range communications network using a short-range communications protocol to connect to other communications devices. For example, communications circuitry 143 may be operative to create a local communications network using the BLUETOOTH® protocol to couple an electronics device 1-N 140 with a BLUETOOTH® headset.

In one embodiment, control circuitry 144 may be operative to control the operations and performance of an electronics device 1-N 140. Control circuitry 144 may include, for example, a processor, a bus (e.g., for sending instructions to the other components of an electronics device 1-N 140), memory, storage, or any other suitable component for controlling the operations of an electronics device 1-N 140. In some embodiments, a processor may drive the display and process inputs received from the user interface. The memory and storage may include, for example, cache, Flash memory, ROM, and/or RAM. In some embodiments, memory may be specifically dedicated to storing firmware (e.g., for device applications such as an operating system, user interface functions, and processor functions). In some embodiments, memory may be operative to store information related to other devices with which an electronics device 1-N 140 performs communications operations (e.g., saving contact information related to communications operations or storing information related to different media types and media items selected by the user).

In one embodiment, the control circuitry 144 may be operative to perform the operations of one or more applications implemented on an electronics device 1-N 140. Any suitable number or type of applications may be implemented. Although the following discussion will enumerate different applications, it will be understood that some or all of the applications may be combined into one or more applications. For example, an electronics device 1-N 140 may include an application connection application, a dialog application, a map application, a media application (e.g., QuickTime, MobileMusic.app, or MobileVideo.app). In some embodiments, an electronics device 1-N 140 may include one or several applications operative to perform communications operations. For example, an electronics device 1-N 140 may include a messaging application, a mail application, a telephone application, a voicemail application, an instant messaging application (e.g., for chatting), a videoconferencing application, a fax application, or any other suitable application for performing any suitable communications operation.

In some embodiments, an electronics device 1-N 140 may include one or more microphones. For example, an electronics device 1-N 140 may include a microphone to allow the user to transmit audio (e.g., voice audio) during a communications operation or as a means of establishing a communications operation or as an alternate to using a physical user interface. A microphone may be incorporated in an electronics device 1-N 140, or may be remotely coupled to an electronics device 1-N 140. For example, a microphone may be incorporated in wired headphones, or a microphone may be incorporated in a wireless headset.

In one embodiment, an electronics device 1-N 140 may include any other component suitable for performing a communications operation. For example, an electronics device 1-N 140 may include a power supply, ports or interfaces for coupling to a host device, a secondary input mechanism (e.g., an ON/OFF switch), or any other suitable component.

In one embodiment, a user may direct an electronics device 1-N 140 to perform a communications operation using any suitable approach. As one example, a user may receive a communications request from another device (e.g., an incoming telephone call, an email or text message, an instant message), and may initiate a communications operation by accepting the communications request. As another example, the user may initiate a communications operation by identifying another communications device and transmitting a request to initiate a communications operation (e.g., dialing a telephone number, sending an email, typing a text message, or selecting a chat screen name and sending a chat request).

In one embodiment, an electronic device 1-N 140 (N being a positive integer) may comprise a mobile device that may utilize mobile device hardware functionality including: the GPS receiver module 146, the camera 145, a compass module, and an accelerometer and gyroscope module. The GPS receiver module 146 may be used to identify a current location of the mobile device (i.e., user). The compass module is used to identify direction of the mobile device. The accelerometer and gyroscope module is used to identify tilt of the mobile device.

The system 100 provides the electronic devices 1-N 140 (N being a positive integer) the ability to connect to an application launched on the television device 120, such as application 1126, application 2127 to application N 128. In one embodiment, the application 1126, application 2127 to application N 128 may comprise software applications executing on the television device 120, or executing on another device and having a visual display portion of the application shown on the display 121.

In one embodiment, the local network (e.g., a wireless network) that the television device 120 is connected to is a secured network with a security code (e.g., pass code, password, key code, etc.) providing access to the local network such that without having knowledge of the key code, the electronic devices 1-N 140 cannot pair or join the local network. In one embodiment, access is provided to the electronic devices 1-N 140 to the local network that the application is launched by means for connecting, such as by obtaining information from a server based on location of an electronic device (e.g., electronic devices 1-N 140), obtaining information from a communication (e.g., text message, email, chat, etc.), etc. In one embodiment, once an electronic device 1-N 140 is connected to the local network, the connection may have a limited life for security purposes (e.g., one hour, two hours, 4 hours, etc.). In one embodiment, the security code may be unique for each session.

Figure 3:
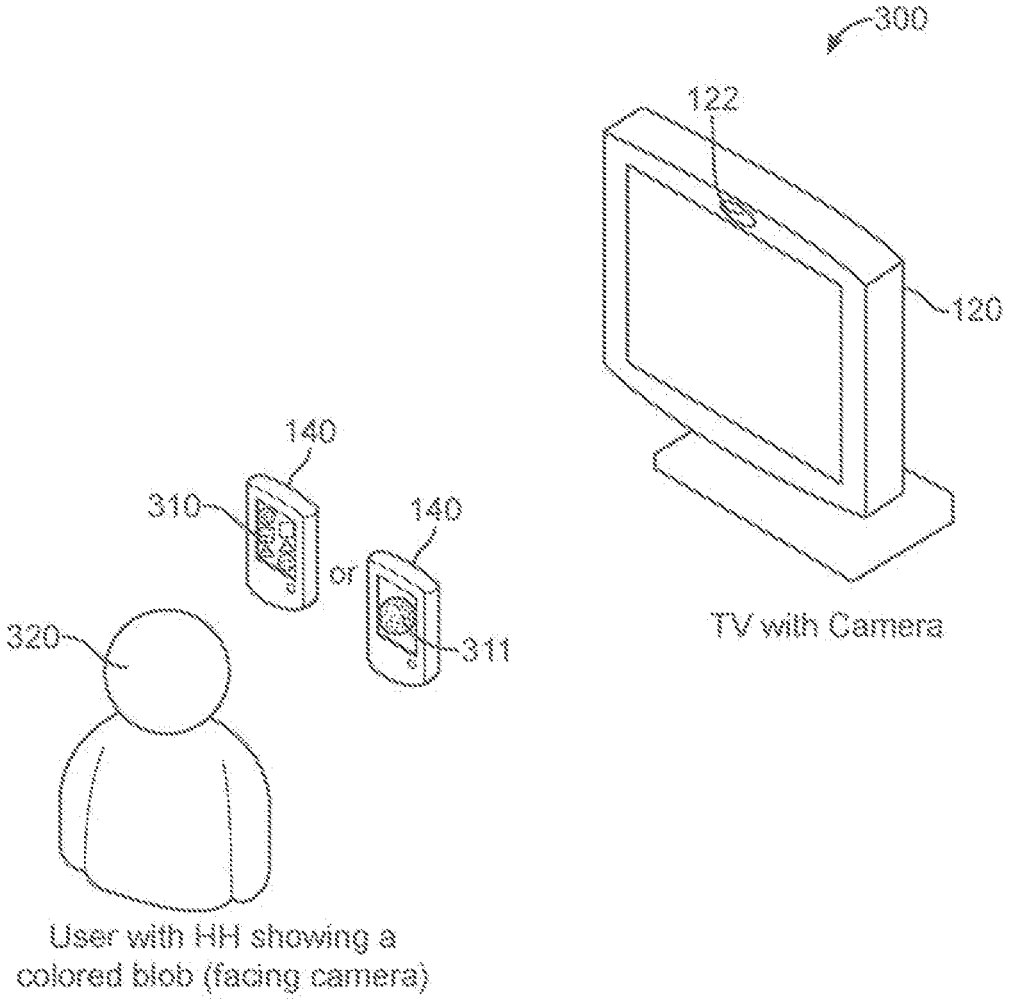
FIG. 3 shows an example scenario for device pairing, according to an embodiment.

FIG. 3 shows an example scenario 300 for device pairing, according to an embodiment. One or more embodiments provide for a user at home to pair their HH electronic device 140 with a TV 120 where there is a possibility of multiple TVs 120 in the household or other environment. In one or more embodiments, in the case the HH device is used by multiple family/community members, the pairing process associates a particular user (e.g., user 320) with the HH electronic device 140.

In one embodiment, for scenario 300 it is assumed that multiple TVs 120 and multiple HH electronic devices 140 are present in the environment (e.g., a home environment). In one embodiment, for scenario 300, the HH electronic device 140 and TV 120 are on the same network (or access point (AP)), which may be a particular home setting and the HH electronic device 140 and TV 120 have been paired. In one embodiment, it may be assumed for scenario 300 that the TV camera 122 is constantly working (or may be started by a command, such as a voice command, remote control (RC) command, etc.), and the TV camera 122 is able to recognize a characteristic (e.g., color, pattern, shape, etc.) of an image or object (e.g., a blob, design, photograph, pattern, etc.) on the display 141 of the HH electronic device 140. In one embodiment, for scenario 300 it is assumed that the TV camera 122 and other processing by the TV 120 is able to recognize and keep track of a user face (e.g., via facial recognition techniques).

In one embodiment, scenario 300 identifies which HH electronic device 140 (of multiple HH electronic devices 140) is desired to be paired with which TV 120 (of multiple TVs 120). In one embodiment, a guest or user launches an HH convergence application (App), starts a listener (user datagram protocol (UDP), Universal plug and play (UPnP), etc.), displays a known image 311 (e.g., simple) or series or set of images 310 (e.g., complex) on the display 141 having a first characteristic (e.g., color, shade, pattern, shape, etc.), and the user holds the HH electronic device 140 up to TV camera 122 with the display 141 facing the TV camera 122. In one example embodiment, the image(s) 310 or 311 may be: a colored blob, simple shape, or shape that may change over time; complex shape, static or dynamic pattern, etc.

In one example embodiment, in the case of the image(s) 310 or 311 being a static color blob or pattern, the TV 120 sends broadcast commands to all HH electronic devices 140 (e.g., connected with the network, e.g., a local area network (LAN), home network, etc.) to change the color of the image(s) 310 or 311 on respective displays 141 to a different but randomly selected characteristic (e.g., color, pattern, shape, etc.), e.g., (HH1→color 1, HH2→color 2 etc.). In one embodiment, a re-change request/command may be sent by the TV 120 in the event that there are more than one HH electronic device 140, and the more than one HH electronic devices 140 have used/chosen close a characteristic (e.g., colors, shapes, patterns, etc.) for the respective image(s) 310 or 311 as determined by the TV 120 using the TV camera 122.

In one or more embodiments, either a complex or simple color blob, shape or pattern 311 or a complex or simple series of color blobs, shapes or patterns 310 are based on camera resolution, lightening, distance, etc. In one or more embodiments, if the camera or image sensor is able to recognize a complex color blob, shape or pattern 311 or series 310, then the number of color changes required to recognize an electronic device 140 may be minimized. If a simple color blob, shape or pattern 311 or series 310 needs to be used, then a larger number of characteristic changes may be needed in order to recognize (or distinguish) an electronic device 140.

Figure 4:
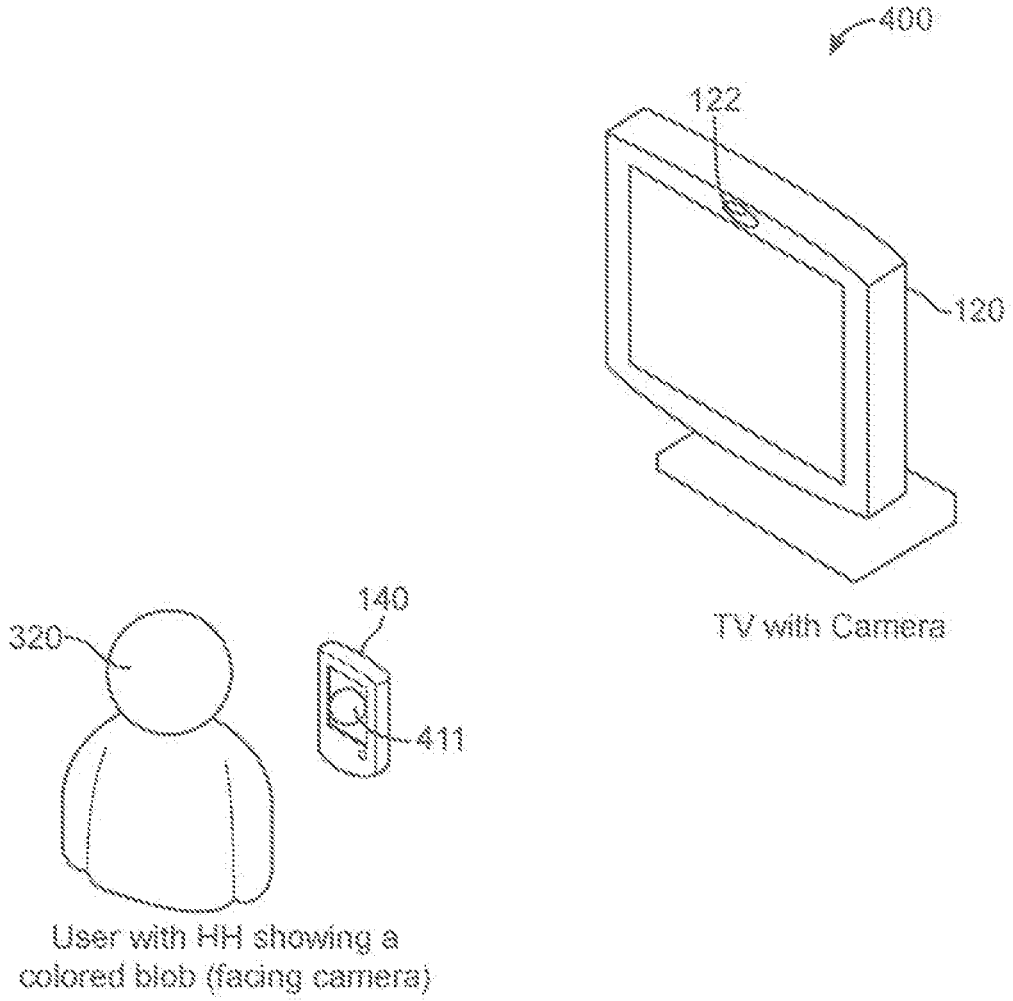
FIG. 4 shows another example scenario for device pairing, according to an embodiment.

FIG. 4 shows another example scenario 400 for device pairing, according to an embodiment. In one embodiment, the HH electronic device 140 held in front of the TV 120 by a user 320 changes image 411 object characteristic (e.g., color, shade, shape, pattern, etc.) on the display 141 of HH electronic device 140 to the one directed by the TV 120 for identifying which HH electronic device 140 it is (among multiple HH electronic devices 140 with other characteristics for the image 411). In one embodiment, the HH electronic device 140 changes the characteristic by changing a pattern of an object 411 that identifies which HH electronic device 140 (of multiple HH electronic devices 140) it is.

Figure 5:
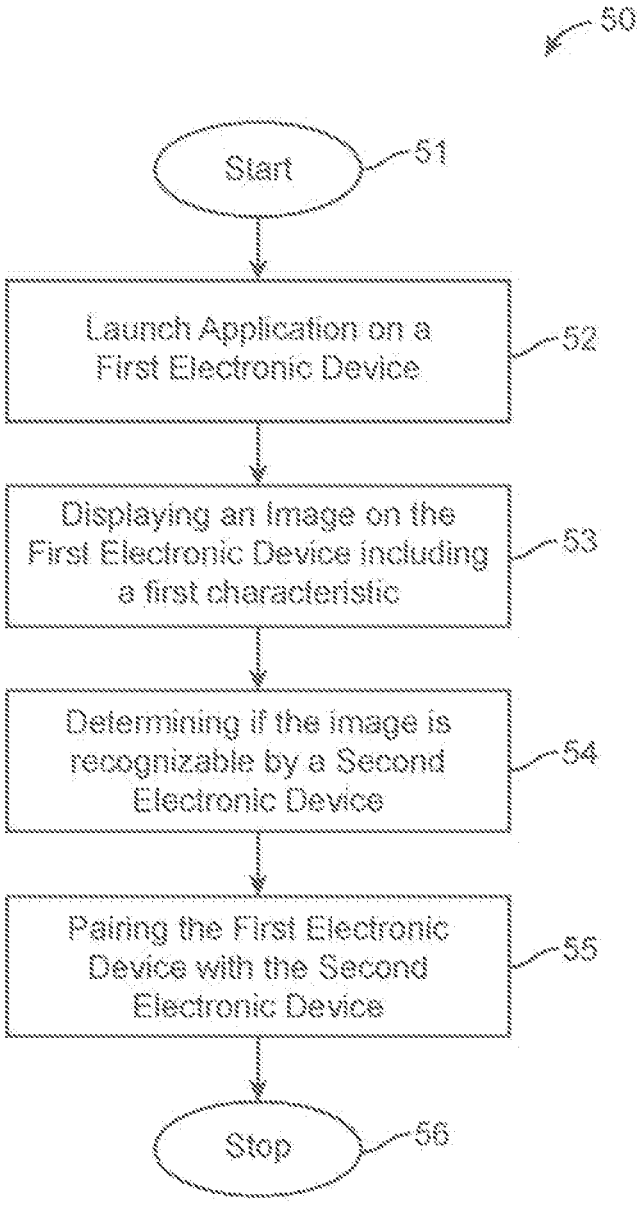
FIG. 5 shows an example flow chart for device pairing, according to an embodiment.

FIG. 5 shows an example flow chart for a process 50 for device pairing, according to an embodiment. In one embodiment, the process 50 starts in block 51 (e.g., an HH electronic device 140 turns on, a TV 120 turns on, etc.). In one embodiment, in block 52 an HH electronic device 140 (a first electronic device) launches an application for pairing/associating the HH electronic device 140 with a TV 120 (second electronic device) in an environment or particular area, such as a home network, LAN, etc. In one embodiment, in block 53, the HH electronic device 140 displays an image(s) on a display (e.g., display 141) including a first characteristic (e.g., color, pattern, shape, etc.).

In one embodiment, in block 54, the TV 120 attempts to recognize the image(s) and first characteristic for the electronic device 140. In one embodiment, in block 55, if the TV 120 recognizes the image and first characteristic, the TV 120 and the electronic device 140 pair with one another. In one embodiment, block 56 the pairing process 50 stops, and the application may continue to another step, such as communicate particular messages with between the paired devices, share information between the paired devices, etc.

In one embodiment, process 50 further includes if it is determined that the image and first characteristic is not recognizable or indistinguishable from any other electronic devices 140 in the particular environment or area (e.g., LAN, home network, room, etc.) the HH electronic device 140 (and any other HH electronic devices 140 in the environment) receives a request to change the first characteristic to one or more second characteristic (e.g., color, shade, shape, pattern, etc.) from the TV 120. In one embodiment, process 50 further includes the HH electronic device 140 (and any other HH electronic devices 140 in the environment) changes the image to have the second characteristic. In one embodiment, a camera of the TV 120 (TV camera 122) recognizes the change to the second characteristic by the HH electronic device 140, which has a display 141 placed in front of the TV camera by a user (e.g., user 320) showing the second characteristic of the image. In one embodiment, the HH electronic device 140 (first electronic device) is now paired with the TV 120 (second electronic device).

Figure 6:
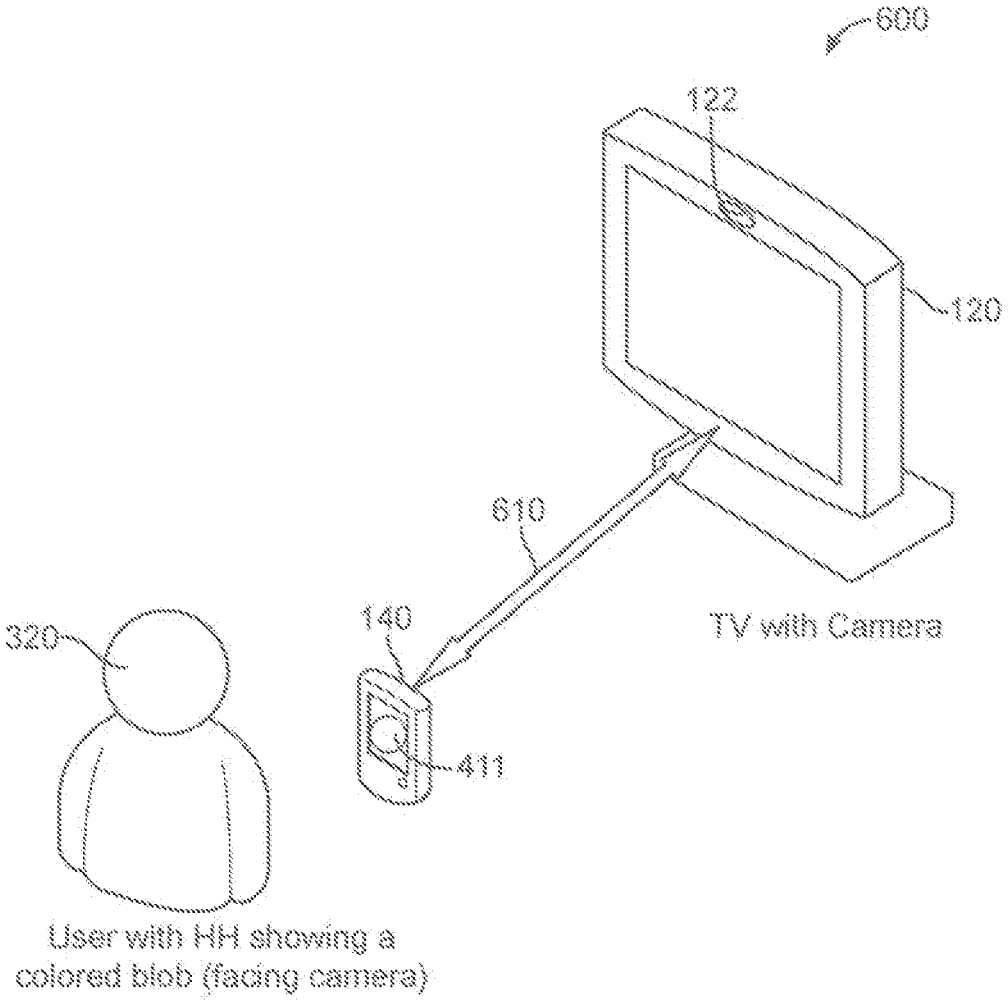
FIG. 6 shows an example scenario for device pairing, according to an embodiment.

FIG. 6 shows an example scenario 600 for device pairing, according to an embodiment. In one embodiment, after the HH electronic device 120 has a characteristic of an image 411 recognized by the TV 120 using the TV camera 122, the HH electronic device 140 becomes paired 610 with the TV 120. In one embodiment, the TV 120 may assign the HH electronic device 140 a unique image(s) (e.g., a unique blob) with a uniquely identifiable characteristic (e.g., color, shade, shape, pattern, etc.) for future use, other applications, etc. In one embodiment, the TV 120 may send an acknowledge message (ACK) to the HH electronic device 140 once the second characteristic of the image is recognized by the TV 120, and the HH electronic device 140 may then continue with the next step on the application being executed or start another application.

Figure 7:
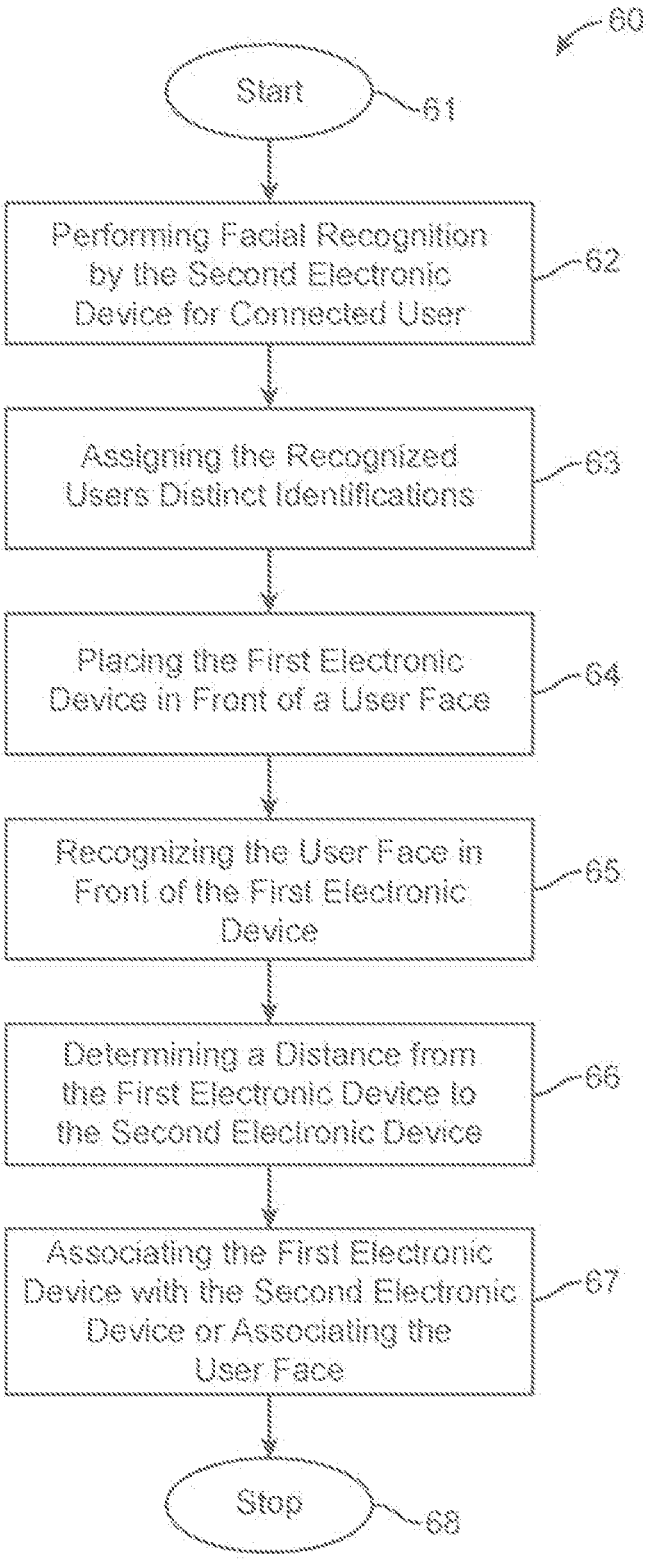
FIG. 7 shows another example flow chart for device pairing, according to an embodiment.
Figure 8:
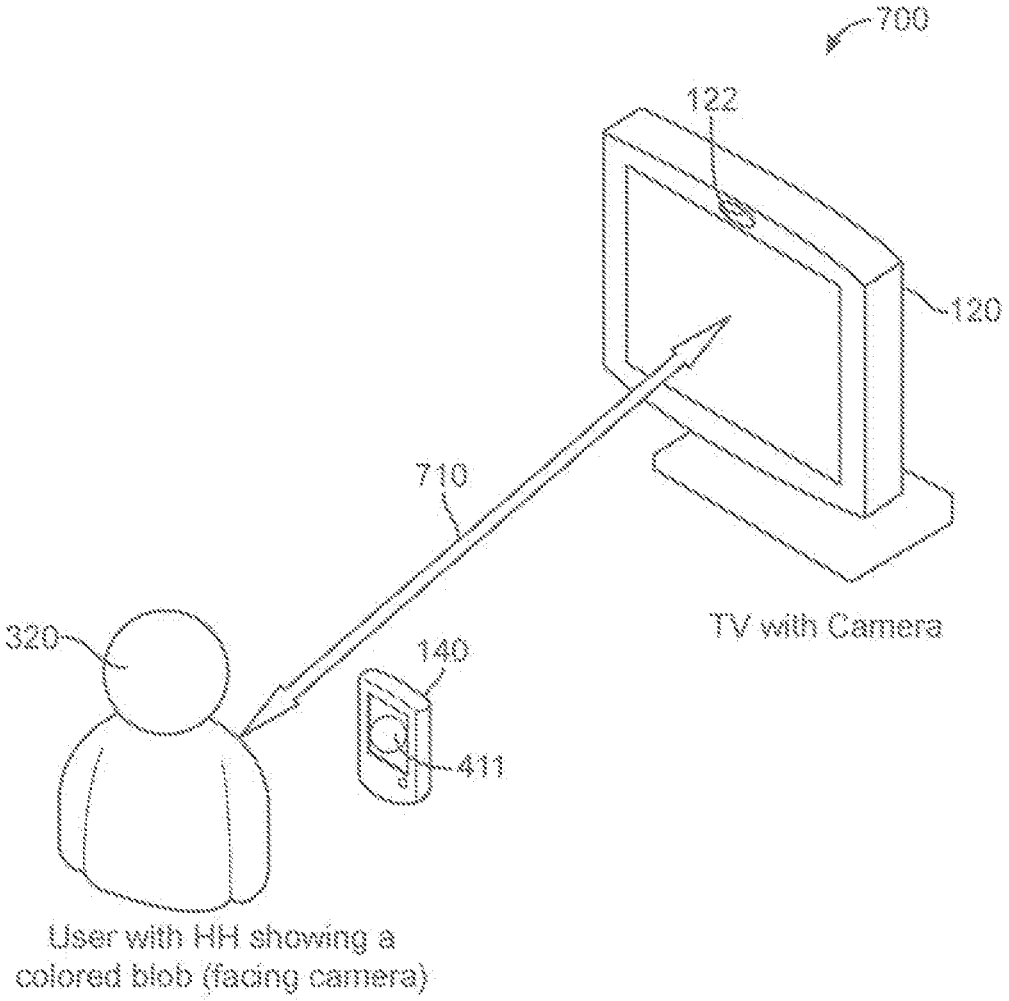
FIG. 8 shows an example scenario for pairing with a user face, according to an embodiment.

FIG. 7 shows another example flow chart for a process 60 for device pairing, according to an embodiment. In one embodiment, process 60 provides for associating a user (e.g., user 320, FIG. 8) with a community/shared HH electronic device 140 (FIG. 8). In one embodiment, process 60 starts in block 61, where the HH electronic device 140 (first electronic device) turns on, starts an application, etc. and the TV 120 (second electronic device) turns on, starts an application, etc.). In one embodiment, for process 60 it may be assumed that all users' faces have been identified by the TV 120 using the TV camera 122 and the users have been assigned a name/Identification (ID).

In one embodiment, in block 62 the TV 120 performs facial recognition for a user of a connected (to the network, e.g., home network, LAN, etc.) HH electronic device 140. In one embodiment, in block 63 a recognized user is assigned a distinct ID. In one embodiment, in block 64 a user places an HH electronic device 140 in front of the user's face. In one embodiment, in block 65 the TV 120 recognizes the user face in front of the HH electronic device 140.

In one embodiment, in block 66, the TV 120 determines the distance from the HH electronic device 140 to the TV 120. In one embodiment, in block 67 the TV 120 associates with the HH electronic device 140 or associates with the user face of the HH electronic device 140. In one embodiment, the process 60 stops at block 68, where the application may proceed to a next step for communication between the HH electronic device 140 and the TV 120, or communicate using another application, etc.

FIG. 8 shows an example scenario 700 for pairing with a user 320 face, according to an embodiment. In one embodiment, for scenario 700 it is assumed that multiple TVs 120 and multiple HH electronic devices 140 are present in the environment (e.g., a home environment). In one embodiment, for scenario 700, the HH electronic device 140 and TV 120 are on the same network (or AP), which may be a particular home setting and the HH electronic device 140 and TV 120 have been paired. In one embodiment, it may be assumed for scenario 700 that the TV camera 122 is constantly working (or may be started by a command, such as a voice command, RC command, etc.), and the TV camera 122 is able to recognize a characteristic (e.g., color, pattern, shape, etc.) of an image or object (e.g., a blob, design, photograph, pattern, etc.) on the display 141 of the HH electronic device 140. In one embodiment, for scenario 700 it is assumed that the TV camera 122 and other processing by the TV 120 is able to recognize and keep track of a user face (e.g., via facial recognition techniques). In one embodiment, it is also assumed that all users' faces have been identified by the TV 120 and have been assigned a particular name/ID.

In one embodiment, in scenario 700 a user 320 holds up the HH electronic device 140 close to their face and starts a convergence App. In one embodiment, the App displays an image 411 having a first characteristic (e.g., color, shape, pattern, etc.), such as a colored blob, on the display 141 of the HH electronic device 140. In one embodiment, the TV 120 sends commands to all HH electronic devices 140 in the environment (e.g., in the home network, LAN, etc.) to change the first characteristic to a second characteristic (e.g., color, shape, pattern, etc.) that is a different, but randomly selected characteristic, e.g., color (HH1→color 1, HH2→color 2 etc.).

In one embodiment, all of the HH electronic devices 140 change to a second characteristic, such as change of color of the image, as directed by the TV 120. In one embodiment, based on the new characteristic that the TV camera 122 now observes, the TV 120 identifies the HH electronic device 140 in front of the TV 120. In one embodiment, the TV 120 recognizes the characteristic change and sends a command to the HH electronic device 140 to move to the next step in the App. In one embodiment, the TV 120 recognizes the face closest to the HH electronic device 140. Once the user 320 face is recognized by the TV 120, the HH electronic device 140 is associated to the face (or user 320), which is paired with the TV 120 as shown by the arrow 710.

Figure 9:
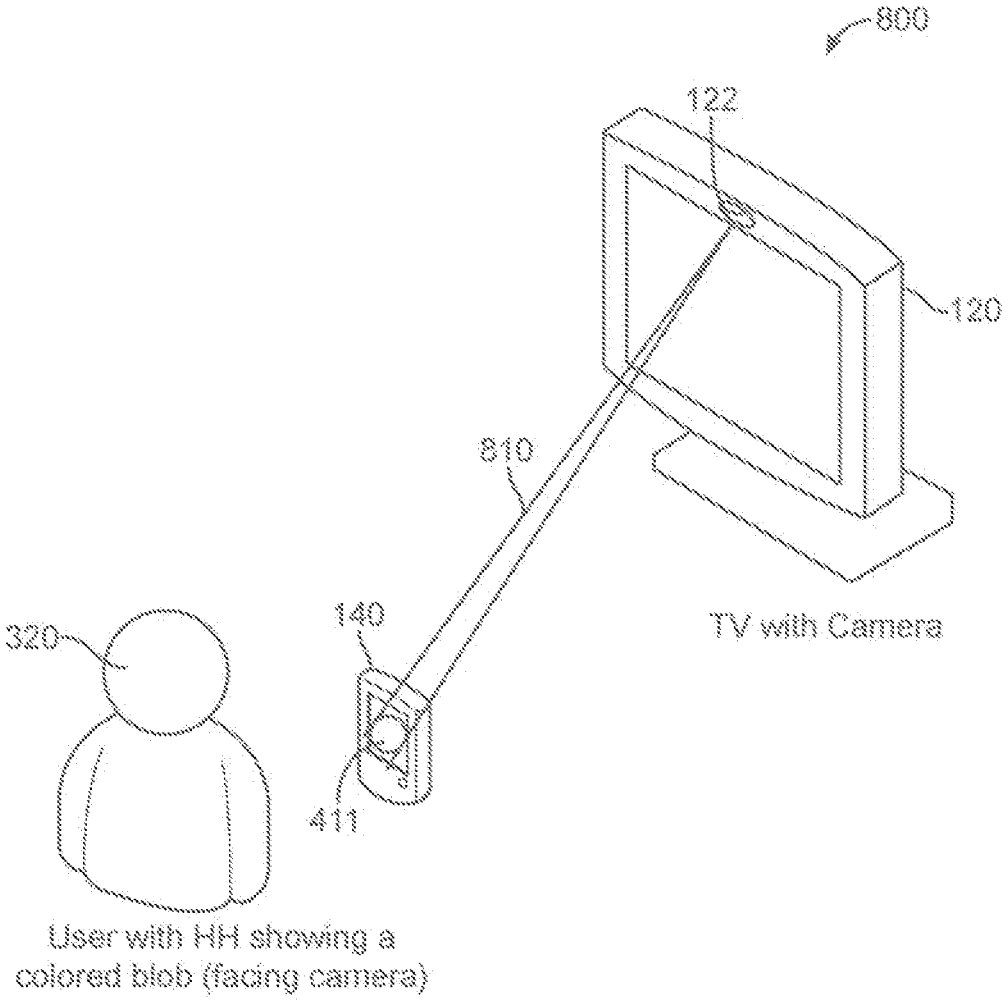
FIG. 9 shows an example scenario for determining distance between paired devices, according to an embodiment.

FIG. 9 shows an example scenario 800 for determining distance 810 between paired devices, according to an embodiment. In one embodiment, determining the relative distance of the user 320 with respect to the TV 120 may be useful to determine display characteristics, such as the font size, personal preferences, etc. In one embodiment, for scenario 800 it is assumed that multiple TVs 120 and multiple HH electronic devices 140 are present in the environment (e.g., a home environment). In one embodiment, for scenario 800, the HH electronic device 140 and TV 120 are on the same network (or AP), which may be a particular home setting and the HH electronic device 140 and TV 120 have been paired. In one embodiment, it may be assumed for scenario 800 that the TV camera 122 is constantly working (or may be started by a command, such as a voice command, RC command, etc.), and the TV camera 122 is able to recognize a characteristic (e.g., color, pattern, shape, etc.) of an image or object (e.g., a blob, design, photograph, pattern, etc.) on the display 141 of the HH electronic device 140. In one embodiment, for scenario 800 it is assumed that the TV camera 122 and other processing by the TV 120 is able to recognize and keep track of a user face (e.g., via facial recognition techniques). In one embodiment, it is also assumed that all users' faces have been identified by the TV 120 and have been assigned a particular name/ID.

In one embodiment, in scenario 800 a user 320 holds up the HH electronic device 140 close to their face and starts the convergence App. In one embodiment, the App shows a fixed size image (e.g., an object, a blob, etc.) with a first characteristic (e.g., color, shape, pattern, etc.), which is associated with the HH electronic device 140. In one embodiment, the TV 120 sends commands to all HH electronic devices 140 (connected in the environment) to change the first characteristic to a second characteristic (e.g., color, shape, pattern, etc.), which is different from the first characteristic but randomly selected, e.g., color (HH1→color 1, HH2→color 2 etc.).

In one embodiment, the HH electronic device 140 in front of TV 120 changes the image 411 to the second characteristic (e.g., blob color) to the second characteristic directed by the TV 120 for identifying which HH electronic device 120 it is. In one embodiment, the TV 120 recognizes the characteristic change and sends a command to the HH electronic device 140 to move to the next App step. In one embodiment, since the HH electronic device 140 shows a fixed size image with the second characteristic on the display 141, the TV 120 may determine the distance 810 based on the size of the image 411 as seen by TV camera 122.

In one example embodiment, the distance 810 of the HH electronic device 140 from the TV 120 may be equal to the diameter of the image (e.g., circle (blob)) shown on the display 141 of the HH electronic device 140, divided by the diameter of the image (e.g., a circle) seen by the TV camera 122 multiplied by the focal length of the TV camera 122 lens (e.g., Distance=Camera focal length*(diameter of the HH circle/diameter of the image circle)). In one embodiment, if the user 320 is holding a personal HH electronic device 140, the TV 120 is now paired to the HH electronic device 140 (and therefore, paired to the user 320). In one embodiment, if the user 320 is holding a personal communal HH electronic device 140, the TV 120 recognizes the face closest to the HH electronic device 140, and from there on, the HH electronic device 140 is associated to the particular closest face (or user).

Figure 10:
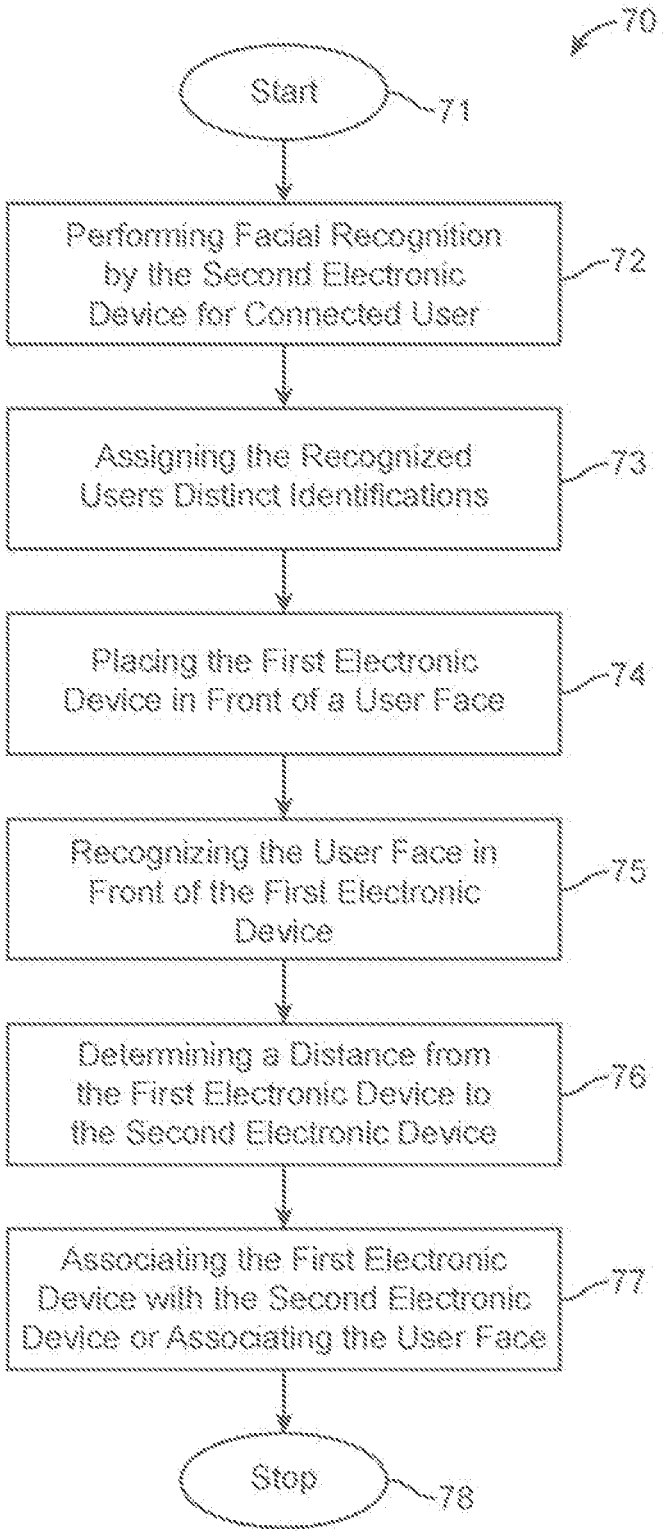
FIG. 10 shows another example flowchart determining distance between paired devices, according to an embodiment.

FIG. 10 shows another example flowchart of a process 70 for determining distance between paired devices, according to an embodiment. In one embodiment, process 70 starts in block 71, where the HH electronic device 140 (first electronic device) turns on, starts an application, etc. and the TV 120 (second electronic device) turns on, starts an application, etc.). In one embodiment, for process 70 it may be assumed that all users' faces have been identified by the TV 120 using the TV camera 122 and the users have been assigned a name/Identification (ID).

In one embodiment, in block 72 the TV 120 performs facial recognition for a user of a connected (to the network, e.g., home network, LAN, etc.) HH electronic device 140. In one embodiment, in block 73 a recognized user is assigned a distinct ID. In one embodiment, in block 74 a user places an HH electronic device 140 in front of the user's face. In one embodiment, in block 75 the TV 120 recognizes the user face in front of the HH electronic device 140.

In one embodiment, in block 76, the TV 120 determines the distance from the first HH electronic device 140 to a second HH electronic device 140, where both are in front of the TV 120. In one embodiment, in block 77 the first HH electronic device 140 is associated with the second HH electronic device 140, or the user face of the first electronic device 140 is associated with a second user face of the second HH electronic device 140. In one embodiment, the process 70 stops at block 78, where the application may proceed to a next step for communication between the first and second HH electronic device 140 and the TV 120, or communicate using another application, etc.

Figure 11:
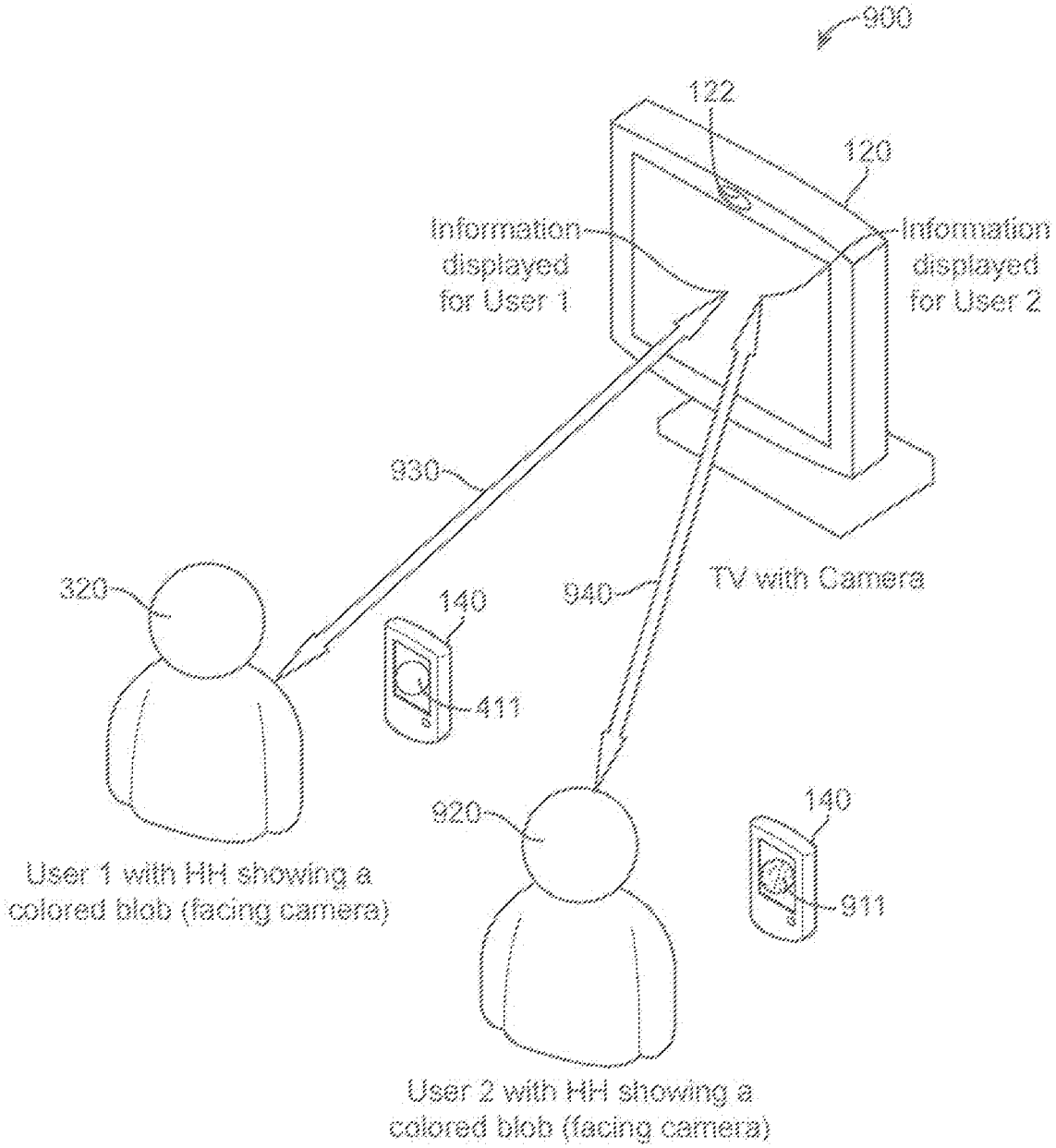
FIG. 11 shows example scenario for device pairing and device relative location determination and tracking, according to an embodiment.

FIG. 11 shows example scenario 900 for device pairing and device relative location determination and tracking, according to an embodiment. In one embodiment, the scenario 900 determines the relative position of two (or more) persons (e.g., user 320 and user 920). In one embodiment, scenario 900 is useful for multiplayer games where relative position of players is important (example car racing, card games, etc.). In one embodiment, for scenario 900 it is assumed that multiple TVs 120 and multiple HH electronic devices 140 are present in the environment (e.g., a home environment). In one embodiment, for scenario 900, the HH electronic device 140 and TV 120 are on the same network (or AP), which may be a particular home setting and the HH electronic device 140 and TV 120 have been paired. In one embodiment, it may be assumed for scenario 900 that the TV camera 122 is constantly working (or may be started by a command, such as a voice command, RC command, etc.), and the TV camera 122 is able to recognize a characteristic (e.g., color, pattern, shape, etc.) of an image or object (e.g., a blob, design, photograph, pattern, etc.) on the display 141 of the HH electronic device 140. In one embodiment, for scenario 900 it is assumed that the TV camera 122 and other processing by the TV 120 is able to recognize and keep track of a user face (e.g., via facial recognition techniques). In one embodiment, it is also assumed that all users' faces have been identified by the TV 120 and have been assigned a particular name/ID. In one embodiment, in scenario 900 is may be assumed that the players (e.g., users 320 and 920) are using communal HH electronic device 140 device (e.g., a game controller) or a personal HH electronic device 140 (e.g., personal game controller).

In one embodiment, scenario 900 is an extension of scenario 800 where each user 320 and 920 is paired with a specific HH electronic device 140, as indicated by the arrows 930 and 940. In one example embodiment, once the two HH electronic devices 140 are paired with one another (or the user's 320 and 920 faces are associated), then the TV 120 may follow each user by using the TV camera 122 and keep track of the users 320 and 920 relative location. In one embodiment, the TV 120 using the TV camera 122 determines the relative distance between the two users 320 and 920, and content shown on the TV 120 may be tailored to the users 320 and 920 based on their particular location relative to one another, such as personal information related to a game, content related to a program or application, content based on personal profiles of each user 320 and 920, etc.

Figure 12:
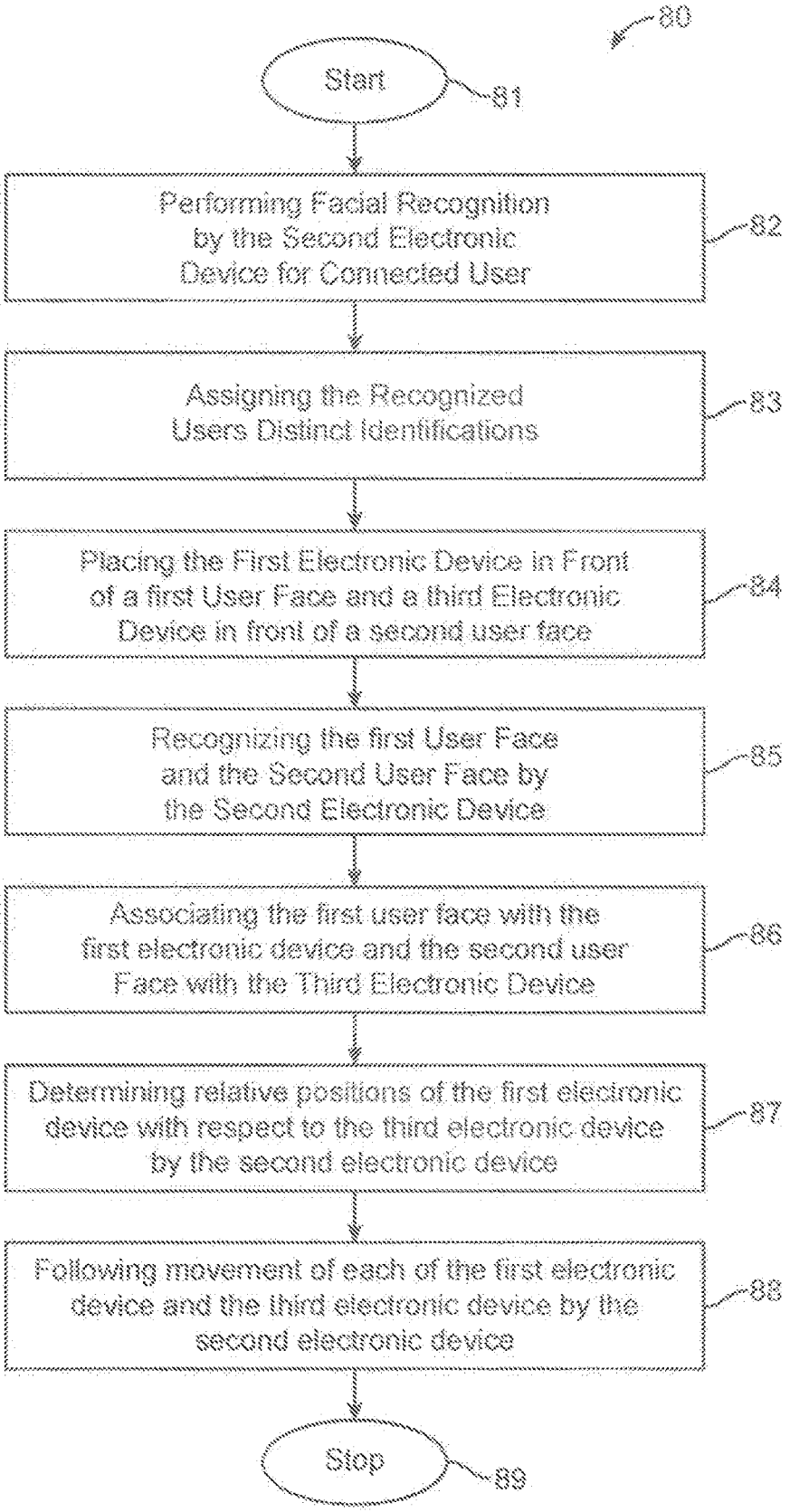
FIG. 12 shows another example flowchart for device pairing and device relative location determination and tracking, according to an embodiment.

FIG. 12 shows another example flowchart of a process 80 for device pairing and device relative location determination and tracking, according to an embodiment. In one embodiment, process 80 starts in block 81, where an HH electronic device 140 (first electronic device) and another HH electronic device 140 (third electronic device) turns on, starts an application, etc. and the TV 120 (second electronic device) turns on, starts an application, etc.). In one embodiment, for process 80 it may be assumed that all users' faces have been identified by the TV 120 using the TV camera 122 and the users have been assigned a name/ID.

In one embodiment, in block 82 the TV 120 performs facial recognition for a user of the first and second connected (to the network, e.g., home network, LAN, etc.) HH electronic devices 140 (first and third electronic devices). In one embodiment, in block 83 the recognized users of the two HH electronic devices are assigned distinct IDs. In one embodiment, in block 84 a user of the first HH electronic device 140 (first electronic device) and the user of the second HH electronic device 140 (third electronic device) places the respective HH electronic device 140 in front of the respective user face. In one embodiment, in block 85 the TV 120 recognizes the user's faces in front of each HH electronic device 140.

In one embodiment, in block 86, the first user face is associated with the first HH electronic device 140 (first electronic device) and the second user face is associated with the second HH electronic device 140 (third electronic device). In one embodiment, in block 87 the TV 120 determines the relative position between the first HH electronic device 140 and the second HH electronic device 140, where both are in front of the TV 120. In one embodiment, in block 88 the TV 120 using the TV camera 122 follows movement of the first HH electronic device 140 and the second HH electronic device 140. In one embodiment, the process 80 stops at block 89, where the application may proceed to a next step for communication between the first and second HH electronic device 140 and the TV 120, or communicate using another application, etc.

Figure 13:
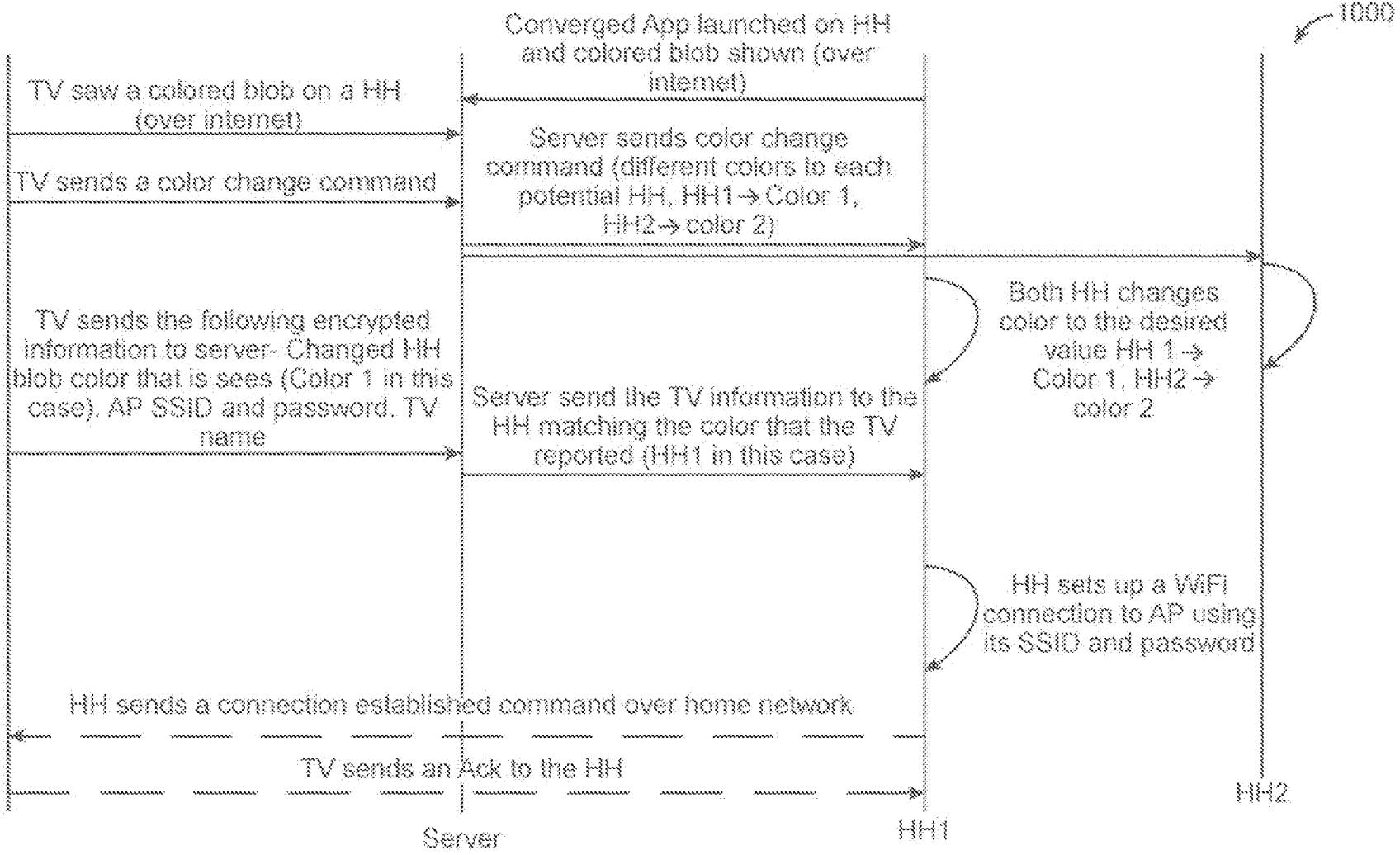
FIG. 13 shows an example timing diagram for device sharing and pairing, according to an embodiment.

FIG. 13 shows an example timing diagram 1000 for device sharing and pairing, according to an embodiment. In one embodiment, to easily access a Wi-Fi network from a HH electronic device 140 in a semi-trusted domain (e.g., friend's residence, organization environment, etc.), where the host does not want to give their AP service set identifier (SSID) and password to the guest. One or more embodiments make it easy for the guest if they want to connect to a TV 120 for a convergence App (e.g., a multi-player gaming app, etc. One or more embodiments determines the relative position of the HH electronic device 140 user (e.g., user 320/920) with respect to the TV 120 by using the TV camera 122, which may be used to determine relative location of multiple users or for pointing to a device using the HH electronic device 140.

In one embodiment, a guest in the semi-trusted environment using an HH electronic device 140 does not know the host AP SSID and password. In one embodiment, there are multiple TVs 120 in the host home (note that if there is only one TV 120, selecting a TV 120 from a list becomes easier). In one embodiment, there are multiple guests with HH electronic devices 140 at the host home. In one embodiment, the host TV 120 and guest HH electronic device 140 are not been paired. In one embodiment, the TV 120 uses the TV camera 122 for recognizing an image on a display 141 of HH electronic devices 140 when held in front of the TV camera 122. In one embodiment, the TV 120 may identify a user 320/920 (FIG. 11) and assign the user an ID. In one embodiment, the TV 120 may recognize and match a previously identified user.

In one embodiment, once the TV 120 recognizes the users of HH electronic devices 140 (e.g., user 320 and user 920, FIG. 11) based on image and characteristic recognition and/or facial recognition, the TV 120 sends the AP SSID and password to the HH electronic device(s) 140, which may be able to share the AP SSID with other HH electronic devices 140 if permitted by the host.

In one example embodiment, using the timing diagram 1000, a guest HH electronic device 140 is provided with the host AP SSID and password. In one example, assuming that it is desired to launch a convergence App, the guest HH electronic device 140 also desires to pair with host TV 120. In one embodiment, the Host device (e.g., TV 120) launches a TV convergence App (e.g., a shareable App). In one embodiment, the guest launches an HH electronic device 140 convergence App, which shows a known image or series of images with a first characteristic (e.g., color, shape, pattern, etc.), and the user holds the HH electronic device with the display 141 facing the TV camera 122.

In one embodiment, the TV 120 recognizes the image and first characteristic, and sends a time stamped command (e.g., "New HH found") to a server (e.g., server 130, FIG. 2) with the captured image as seen by the TV camera 122. In one embodiment, the HH electronic device 140 sends a time stamped command (e.g., "Showing") to the same server with what it displayed on the display 141. In one embodiment, the server matches the TV 120 and the HH electronic device 140 based on the time stamp and displayed image/objects.

In one embodiment, it is possible that there is more than one TV 120 or HH electronic device 140 that is matched (e.g., more than 2 commands sent in a time window). In one embodiment, there are multiple options to narrow down the list of potential matches and reduce potential false positives. In one embodiment, both the TV 120 and the HH electronic device 140 send out their respective location (or approximation thereof) using, for example, GPS, known information, text information of a known location, etc., which narrows down the search space. In one embodiment, assuming that the host sends out an invitation to all the guests (e.g., email, text message, etc.), the "party" information (e.g., email addresses) may be stored in the server. In one example embodiment, when the "New HH found" and "Showing" commands reach the server, the server may pair HH electronic devices 140 based on the party (host TV 120 and guest HH electronic device 140).

In one example embodiment, each HH electronic device 140 shows a random selected image with a characteristic (e.g., a color, shape, pattern, etc.) on a respective display 141. In one embodiment, the TV 120 recognizes the image and characteristic, and informs the server regarding the image and characteristic.

In one example embodiment, the wireless APs in the vicinity of the HH electronic devices 140 may be matched against the ones the TV 120 is distributing credentials for using the SSID, BSSID or other uniquely identifying information along with signal strength. The one or more example embodiments assist in reducing the list of potential TV 120←→HH electronic device 140 pairing options.

In one or more embodiments, to resolve remaining multiple matches the following may be done. In one example embodiment, the TV 120 sends commands to all HH electronic devices 140 (via the server) that are candidates for the pairing. In one example embodiment, the "Change" command is used to change a characteristic (e.g., color, shape, pattern, etc.) to a different but randomly selected characteristic (e.g., HH1→color 1, HH2→color 2 etc.). In one embodiment, the TV 120 recognizes the change of the characteristic for the HH electronic device 140 in front of the TV camera 122 and sends this information to the server.

In one embodiment, the HH electronic device 140 narrows its location, and then requests from the server a unique code (e.g., a simple or complex: color blob, shape, pattern, etc. with a characteristic (e.g., color, shade, etc.)) to display for this subset of devices it must also identify. In one example embodiment, the HH electronic device 140 then displays code to the TV 120. In one example embodiment, the TV 120 then sends to the server what the TV camera 122 captured from the HH electronic device 140.

In one example embodiment, the TV 120 then sends the AP SSID and password to the server along with its name, which may be set in the App or via the TV 120. In one embodiment, the AP SSID and password are auto-populated if the TV 120 is wirelessly connected. In one embodiment, the server identifies the HH electronic device 140 based on the color reported by the TV and sends the AP SSID, password, and TV name to it. In one example embodiment, the HH electronic device 140 applies these AP settings for connecting with the TV 120 for sharing the App (e.g., Party App, etc.). In one example embodiment, the AP settings information is encrypted so that the user cannot access it. In one example embodiment, to confirm that Wi-Fi settings were correctly applied, there may be another communication session between the TV 120 and the HH electronic device 140 over Wi-Fi. In one example embodiment, the TV 120 sends an ACK to the HH electronic device 140 and the HH electronic device 140 now continues with the next step on the App. In one example embodiment, the GPS on the HH electronic device 140 may be used to determine the TVs 120 location for future use.

In one embodiment, the TV 120 is able to select the HH electronic device 140 in front of it from other HH electronic devices 140 that might be eligible and vice versa (i.e. the HH electronic device 140 may select the TV 120 which it is in front of) depending on which device initiates the discovery. One or more embodiments fall into three categories: Time multiplexed: The image characteristic on the HH electronic device 140 changes in response to the TV 120 (or server) command and the search space is reduced progressively. In one example embodiment, this approach allows for low fidelity camera and simple image detection algorithms, but takes more time since the characteristic may have to change multiple times before the HH electronic device 140 is uniquely identified; Code multiplexed: The image that is shown on the HH electronic device 140 is made up of complex shapes and various characteristics (e.g., colors) which carries more information and makes it more likely to be unique. In one embodiment, this approach forces the TV 120 to have a high-fidelity TV camera 122 and more complex image detection algorithms but reduces the time it takes to uniquely identify the HH; Location multiplex: These approaches limit the number of HH electronic devices 140 that may connect to a TV 120 (reduce the search space). This may be achieved by: Using GPS so that the HH electronic device 140 only searches for a TV 120 in the neighborhood; or Using an invite from a party host to limit only the guest HH electronic device 140 to connect to the party host TV 120. In one embodiment, these techniques may be used individually or in conjunction with each other to solve the search space reduction problem. In one example embodiment, the technique used depends on the camera fidelity and algorithm technology implemented on the TV 120.

In one example embodiment, the relative distance of the user of an HH electronic device 140 with respect to the TV 120 is determined. In one embodiment, this determination is useful to determine the font size, personal preferences, etc. In one example embodiment, all users' faces have been identified by the TV 120 and they have been assigned a name/ID. In one embodiment, the HH electronic devices 140 may be paired with the one or more embodiments described above.

In one embodiment, the relative position of two (or more) persons based on the HH electronic devices 140 may be determined. In one example embodiment, this is useful for multiplayer games where relative position of players is important (e.g., car racing video games, card games, etc.). In one example embodiment, all user faces have been identified by the TV 120 and they have been assigned a name/ID. In one example embodiment, the players are using a communal HH electronic device 140 (e.g., a communal game controller) or a personal HH device electronic device 140 (e.g., a personal game controller). In one example embodiment, this scenario may be implemented in the same way as described above in one or more embodiments.

Figure 14:
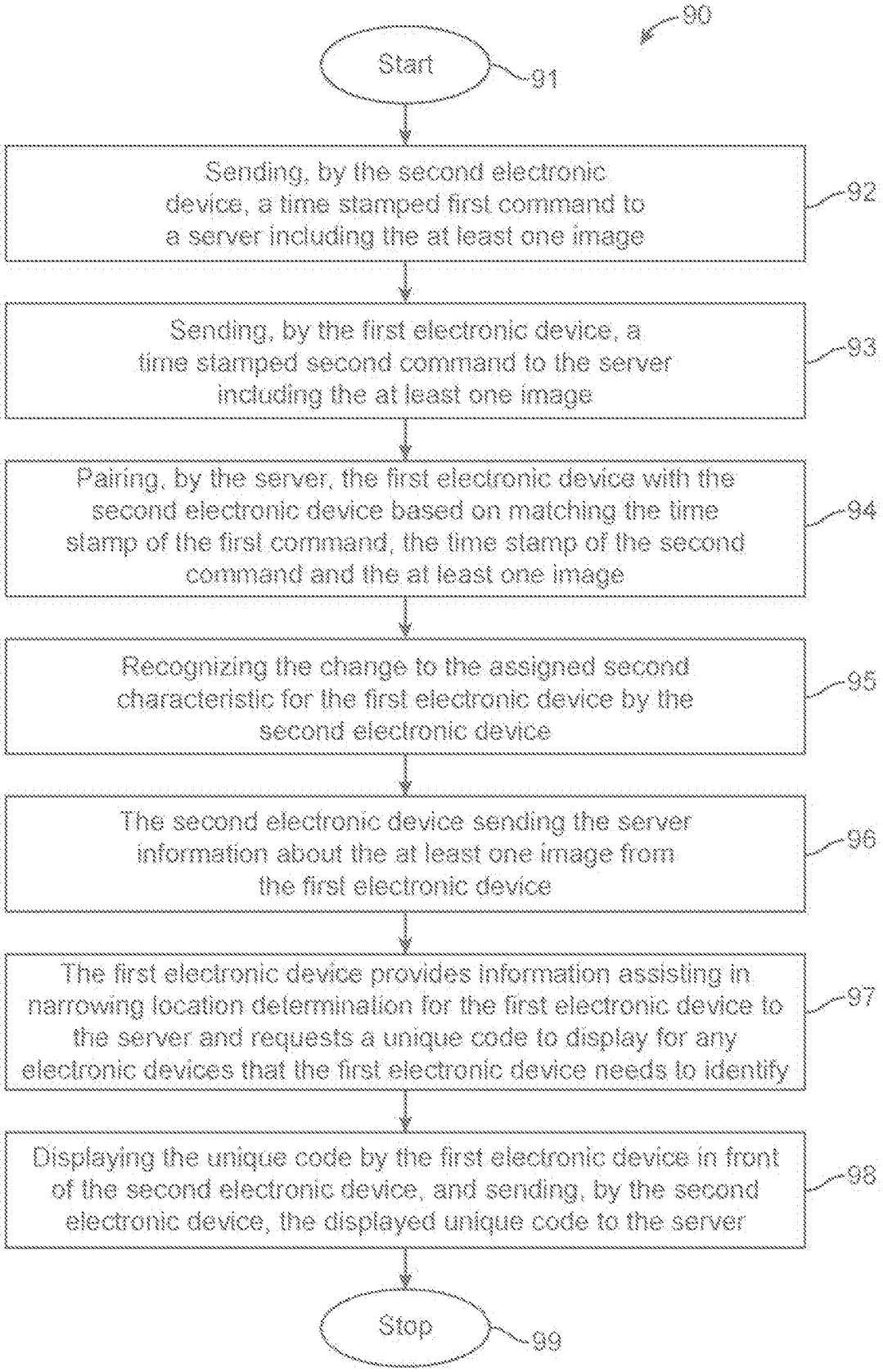
FIG. 14 shows another example flowchart for device sharing and pairing, according to an embodiment.

FIG. 14 shows another example flowchart for a process 90 device sharing and pairing, according to an embodiment. In one embodiment, process 90 starts in block 91, where an HH electronic device 140 (first electronic device) turns on, starts an application, etc. and the TV 120 (second electronic device) turns on, starts an application, etc.). In one embodiment, for process 90 it may be assumed that all users' faces have been identified by a TV 120 using a TV camera 122 and the users have been assigned a name/ID.

In one embodiment, in block 92 the TV 120 sends a time-stamped command to a server (e.g., server 130, FIG. 2) including an image with a first characteristic (e.g., color, shape, pattern, etc.) that was captured from an HH electronic device 140 display 141 using a TV camera 122. In one embodiment, in block 93 the HH electronic device 140 sends a time-stamped command to the server including the image displayed using the display 141. In one example embodiment, in block 94, the server pairs the HH electronic device with the TV 120 based on matching the received images and the commands including time-stamps from the TV 120 and the HH electronic device 140.

In one example embodiment, in block 95 the TV 120 recognizes a characteristic change to the image displayed by the HH electronic device 140. In one example embodiment, in block 96 the TV 120 sends the server information about the image and changed characteristic as captured from the HH electronic device 140 using the TV camera 122. In one example embodiment, in block 97 the HH electronic device 140 provides information assisting in narrowing location determination (e.g., GPS, text including location information, etc.) of the HH electronic device 140 to the server and requests a unique code (e.g., simple or complex: color blob, shape, pattern, etc., with a characteristic (e.g., color, shade, etc.)) to display for any devices that the HH electronic device 140 needs to identify.

In one example embodiment, in block 98 the HH electronic device 140 receives the unique code and displays the unique code in front of the TV 120, which uses the TV camera 122 to capture the unique code, where the TV 120 sends the unique code to the server. In one embodiment, the process 90 stops at block 99, where the application may proceed to a next step for communication between the HH electronic device 140 and the TV 120, or communicate using another application, etc.

Figure 15:
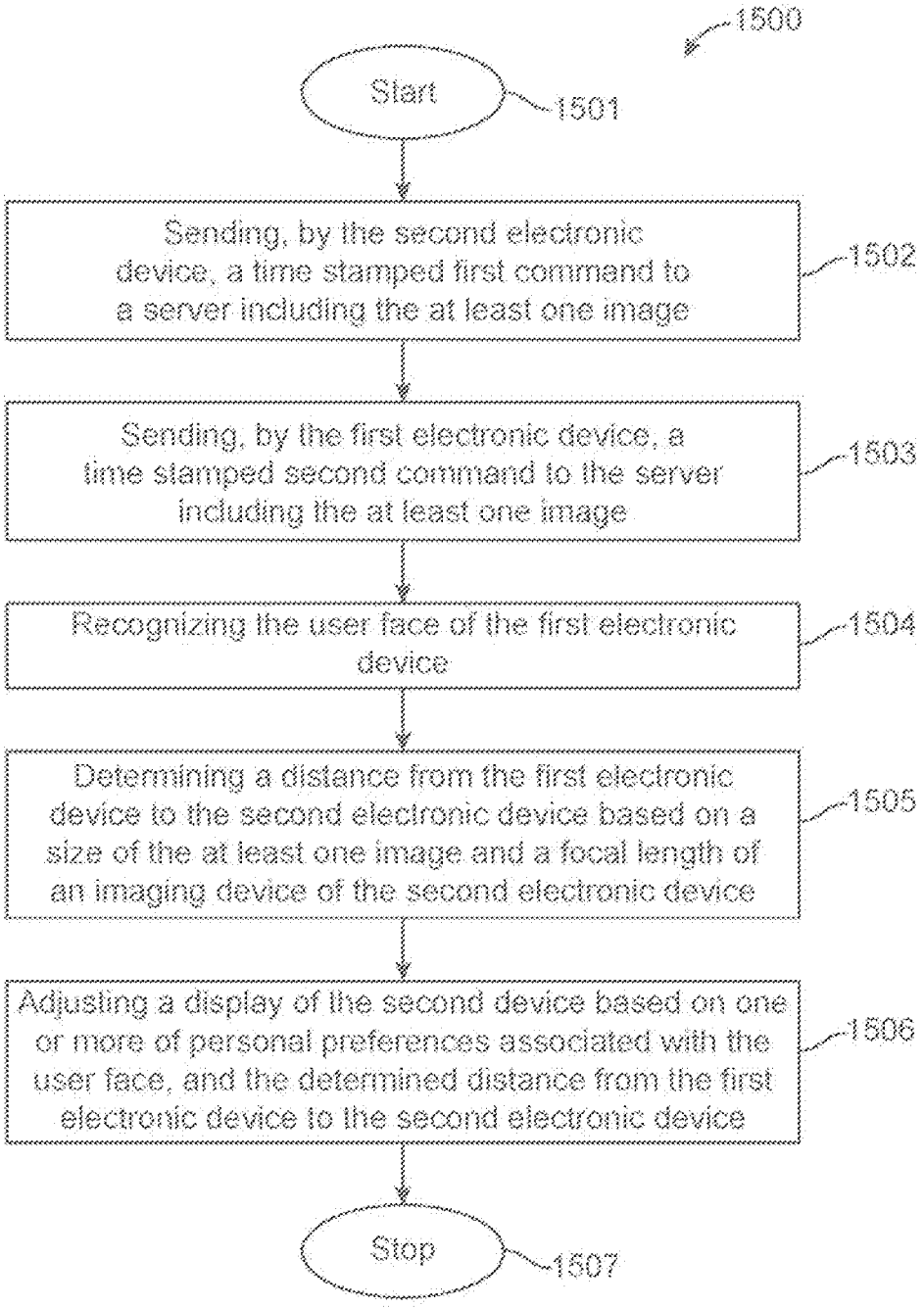
FIG. 15 shows another example flowchart for device pairing, determining distance between the paired devices and adjusting a display based on the pairing, according to an embodiment.

FIG. 15 shows another example flowchart for a process 1500 for device pairing, determining distance between the paired devices and adjusting a display based on the pairing, according to an embodiment. In one embodiment, process 1500 starts in block 1501, where an HH electronic device 140 (first electronic device) turns on, starts an application, etc. and the TV 120 (second electronic device) turns on, starts an application, etc.). In one embodiment, for process 1500 it may be assumed that all users' faces have been identified by a TV 120 using a TV camera 122 and the users have been assigned a name/ID.

In one embodiment, in block 1502 the TV 120 sends a time-stamped command to a server (e.g., server 130, FIG. 2) including an image with a first characteristic (e.g., color, shape, pattern, etc.) that was captured from an HH electronic device 140 display 141 using a TV camera 122. In one embodiment, in block 1503 the HH electronic device 140 sends a time-stamped command to the server including the image displayed using the display 141. In one example embodiment, in block 1504, the TV 120 recognizes a user face of the HH electronic device 140.

In one example embodiment, in block 1505 the TV 120 determines the distance from the HH electronic device 140 to the TV 120 based on a size of the image displayed on the display 141 of the HH electronic device 140, the size of the captured image by the TV camera 122 and the focal length of the TV camera 122. In one example embodiment, in block 1506, the display of the TV 120 is adjusted based on one or more personal preferences associated with the user face of the HH electronic device 140 and the determined distance between the HH electronic device and the TV 120.

In one embodiment, the process 1500 stops at block 1507, where the application may proceed to a next step for communication between the HH electronic device 140 and the TV 120, or communicate using another application, etc.

Figure 16:
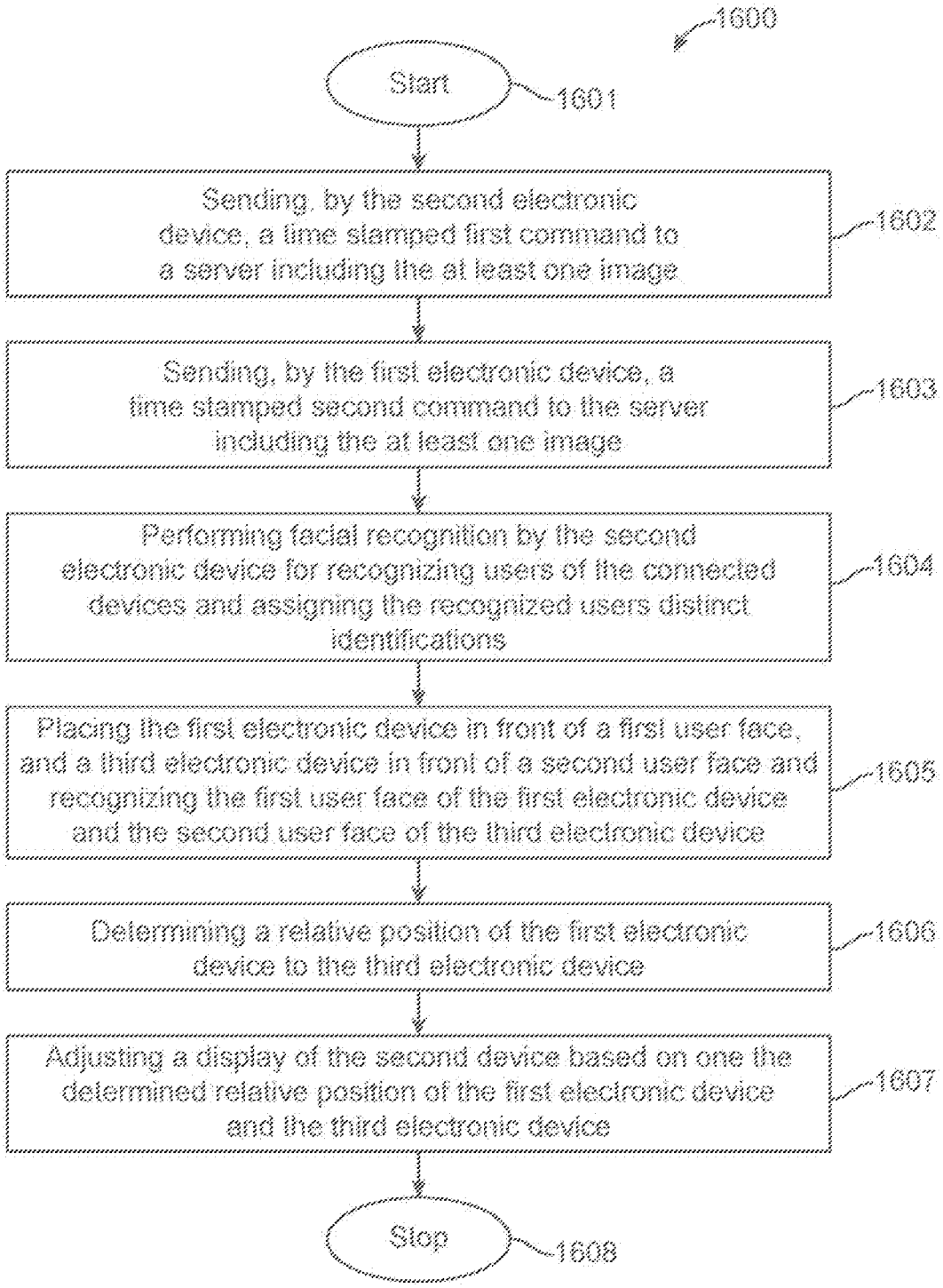
FIG. 16 shows another example flowchart for device pairing, determining distance between multiple paired devices and adjusting a display based on the pairing, according to an embodiment.

FIG. 16 shows another example flowchart for a process 1600 for device pairing, determining distance between multiple paired devices and adjusting a display of a TV 120 based on the pairing, according to an embodiment. In one embodiment, process 1600 starts in block 1601, where a first HH electronic device 140 (first electronic device) and a second HH electronic device 140 (third electronic device) turns on, starts an application, etc. and the TV 120 (second electronic device) turns on, starts an application, etc.). In one embodiment, for process 1600 it may be assumed that all users' faces have been identified by a TV 120 using a TV camera 122 and the users have been assigned a name/ID.

In one embodiment, in block 1602 the TV 120 sends a time-stamped command to a server (e.g., server 130, FIG. 2) including images with first characteristics (e.g., color, shape, pattern, etc.) that were captured from the first and second HH electronic devices 140 displays 141 using a TV camera 122. In one embodiment, in block 1603 the first and second HH electronic devices 140 send time-stamped commands to the server including the respective images displayed using the respective displays 141. In one example embodiment, in block 1604, the TV 120 performs facial recognition for recognizing user faces of the connected HH electronic devices 140 (e.g., the first and second HH electronic devices 140).

In one example embodiment, in block 1605 the user of the first HH electronic device 140 and the user of the second HH electronic device 140 place the respective HH electronic devices 140 in front of the respective user faces. In one embodiment, the TV 120 recognizes the faces of each user of each HH electronic device 140.

In one embodiment, in block 1606 the TV 120 determines the relative position (similarly as for the one or more embodiments described above) of the first HH electronic device 140 as compared with the second HH electronic device 140. In one example embodiment, in block 1607, the display of the TV 120 is adjusted based on the determined relative position of the first and second HH electronic devices 140.

In one embodiment, the process 1600 stops at block 1608, where the application may proceed to a next step for communication between the first and second HH electronic devices 140 and the TV 120, or communicate using another application, etc.

Figure 17:
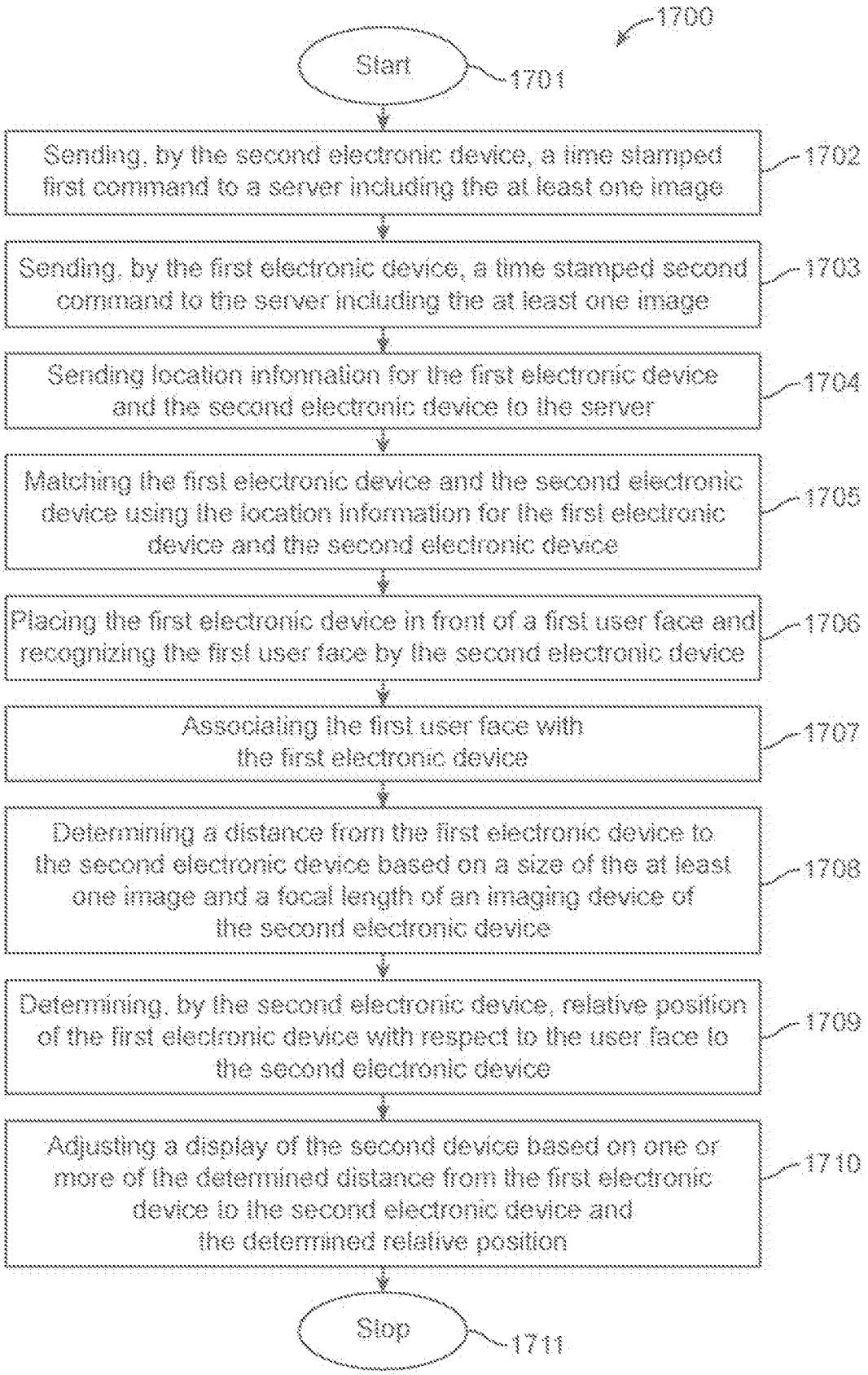
FIG. 17 shows another example flowchart for facial pairing, determining distance between paired devices and adjusting a display based on the pairing, according to an embodiment.

FIG. 17 shows another example flowchart for a process 1700 for facial pairing, determining distance between paired devices and adjusting a display based on the pairing, according to an embodiment. One or more embodiments provide for easy pairing of a personal HH electronic device 140 with a communal fixed device (TV 120 and TV camera 122) in a Campus Area Network (CAN) or Metropolitan Area Network (MAN) to exchange information. One or more embodiments, easily and accurately identify a location of an HH electronic device 140 in a closed space where GPS, Wi-Fi and other location identification methods may not work accurately (e.g., due to reception issues, interference, jamming, etc.).

In one or more embodiments, HH electronic devices 140 are paired in an un-trusted CAN/MAN Wi-Fi network (e.g., airports, schools, malls, etc.) for accurately identifying location. It is noted that pairing is not an issue if AP SSID and password are available (or can be guessed), but accurately identifying the location of an HH electronic device 140 in the absence of specific information (e.g., GPS information) may be an issue. One or more embodiments locate the HH electronic device 140 within line-of-sight and in the neighborhood of a TV camera 122 that is mounted on a TV (or computer), or just buy itself.

In one or more embodiments, incorporating local pairing, or semi-trusted domain pairing embodiments as described above, a user is provided the same user experience for pairing devices regardless of where they are situated (e.g., home, home of a friend, public place, etc.). In one example embodiment, devices are paired and position of an HH electronic device 140 is accurately located without having to be in the physical proximity of a fixed communal device (e.g., NFC reader, QR code reader, etc.). One or more embodiments provide for personalized (or changing) information to be shared between devices, which is not possible with NFC or QR codes.

In one or more embodiments, the CAN or MAN environment (e.g., mall, airport, colleges, etc.) AP with or without repeater and TV (or camera) owner/controller allows a user of an HH electronic device 140 to be on the same network, which may be typically true (e.g., airport, malls, hotels, college campus, etc.). In one example embodiment, multiple TVs 120 and multiple HH electronic devices 140 exist in an un-trusted CAN/MAN domain. In one example embodiment, the user of an HH electronic device 140 does not know a host AP SSID and password (even though it might be easily available). In one example embodiment, the host TV 120 and guest HH electronic device 140 have not been paired. In one example embodiment, it is assumed that the TV camera 122 is constantly working (or may be started by a command) and is able to recognize an image with a characteristic (e.g., color, shape, pattern, etc.) on the HH (electronic device 140.

In one or more embodiments, a user of an HH electronic device 140 is provided with a CAN/MAN AP SSID and password. In one embodiment, the user desires to launch a convergence App, and also desires to pair with CAN/MAN TV 120. In one embodiment, the process 1700 starts in block 1701, where an HH electronic device 140 (first electronic device) turns on, starts an application (e.g., convergence App), etc. and the TV 120 (second electronic device) turns on, starts an application, etc.).

In one embodiment, in block 1702 the TV 120 sends a time-stamped command to a server (e.g., server 130, FIG. 2) including an image with a first characteristic (e.g., color, shape, pattern, etc.) that was captured from the HH electronic device 140 display 141 using a TV camera 122. In one embodiment, in block 1703 the HH electronic device 140 sends a time-stamped command to the server including the image displayed using the display 141. In one embodiment, in block 1704 if location information is available (e.g., GPS signals, Wi-Fi, etc.), the HH electronic device 140 and TV 120 send the location information to the server.

In one embodiment, in block 1705 the server matches the location information of the HH electronic device 140 and the TV 120 using the location information received from each device. In one embodiment, multiple HH electronic devices 140 and multiple TVs 120 send their respective location information, which is then matched by the server to determine which HH electronic device 140 is in front or near to which TV 120.

In one embodiment, in block 1706, the HH electronic device 140 (first electronic device) is placed in front of the user's face, and the TV 120 (second electronic device) recognizes the user face (e.g., performs facial recognition). In one embodiment, in block 1707 the TV 120 associates the user face (first user face) with the HH electronic device 140. In one embodiment, the server pairs the HH electronic device with the TV 120 based on matching the received images and the commands including time-stamps from the TV 120 and the HH electronic device 140, and the location information if available.

In one embodiment, in block 1708 the TV 120 determines the distance from the HH electronic device 140 to the TV 120 based on the size of the displayed image on the HH electronic device 140, the size of the image captured by the TV camera 122 of the TV 120, and the focal length of the TV camera 122. In one example embodiment, in block 1709 the TV 120 may determine the relative position of the HH electronic device 140 with respect to the user face. In one embodiment, in block 1710 the TV 120 adjusts the display based on one or more of the determined distance to the HH electronic device 140 and the determined relative position of the user face. In one embodiment, the TV 120 adjusts the display to the user of the HH electronic device by targeting text/graphics/video in a particular position on the screen, increases font size, etc.

In one embodiment, the process 1700 stops at block 1711, where the application may proceed to a next step for communication between the HH electronic device 140 and the TV 120, or communicate using another application, etc.

One embodiment provides for precisely locating the position of a user HH electronic device 140 in an enclosed space (mall, airport, college) etc. where GPS signals or Wi-Fi might not be accurate (e.g., location information is not available). In one embodiment, the precise location of the user may be determined relative to the location of the TV 120 (or TV camera 122). In one embodiment, the TV 120 is static and its position is known (e.g., by a server) and it does not change. In one embodiment, similarly as to process 1700, the user holds up an HH electronic device 140 and starts the convergence App. In one example embodiment, the App shows a fixed size image with a characteristic (e.g., color, shape, pattern, etc.) which is associated with the HH electronic device 140.

In one example embodiment, the TV-HH pairing occurs as in process 1700. In one embodiment, since the HH electronic device 140 shows a fixed size image with a characteristic, the TV 120 may determine the distance based on the size of the image as seen by TV camera 122. In one embodiment, the distance of the HH electronic device 140 from TV 120 is equal to the diameter of the image (e.g., a circle, blob, etc.) divided by the diameter of the image received by the TV camera 122 multiplied by the focal length of the TV camera 122 lens.

In one example embodiment, the server may request the HH electronic devices to change the characteristic of the displayed image, and the TV 120 recognizes a characteristic change to the image displayed by the HH electronic device 140. In one example embodiment, the TV 120 sends the server information about the image and changed characteristic as captured from the HH electronic device 140 using the TV camera 122.

In one or more embodiments, in the CAN/MAN environment, various uses may be applied. In one example, in a sports bar, persons in front of the TV 120 may be identified and based on their identity (and associated profile information, personal information known, etc.), the TV 120 shows the user particular scores of preferred teams or interested games/events/etc. only on a particular TV 120 based on the user of the HH electronic device 140 being in front of or near to the particular TV 120.

In one example embodiment, users of HH electronic devices 140 may sit in front of a TV 120 and request the TV 120 to show only information that they are interested in from commands from their HH electronic devices 140. In one embodiment, the TV 120 may arbitrate this information if there are multiple HH electronic devices 140 (e.g., majority requests, switching between requests using weighted time periods, etc.).

In one example embodiment, in an airport, the precise location of the person using an HH electronic device 140 may be identified by the TV 120 that they are standing in front of. In one example embodiment, the TV 120 may provide the particular users directions, arrival/destination information pertinent to them, or provide live assistance.

In one example embodiment, in a mall, the TV 120 may show information and photos/video (e.g., with products, services, etc.) on a TV 120 near the user and make it a social experience. In one embodiment, the TV 120 may provide for users of HH electronic device 140 to play games, be offered coupons that tie a consumer to a location, etc.

In one embodiment, multiple TVs 120 that are positioned in series or in the path direction of a user of an HH electronic device 140 may transition based on the position of the HH electronic device 140. In one embodiment, the user may be targeted with content on a specific TV 120 based on the time the HH electronic device 140 remains in front of a specific place (e.g., store, display, etc.). In one embodiment, based on information obtained for multiple users of HH electronic devices 140 that may be traveling together, the TV 120 may determine common information that the multiple users may be interested in to target both users simultaneously.

Figure 18:
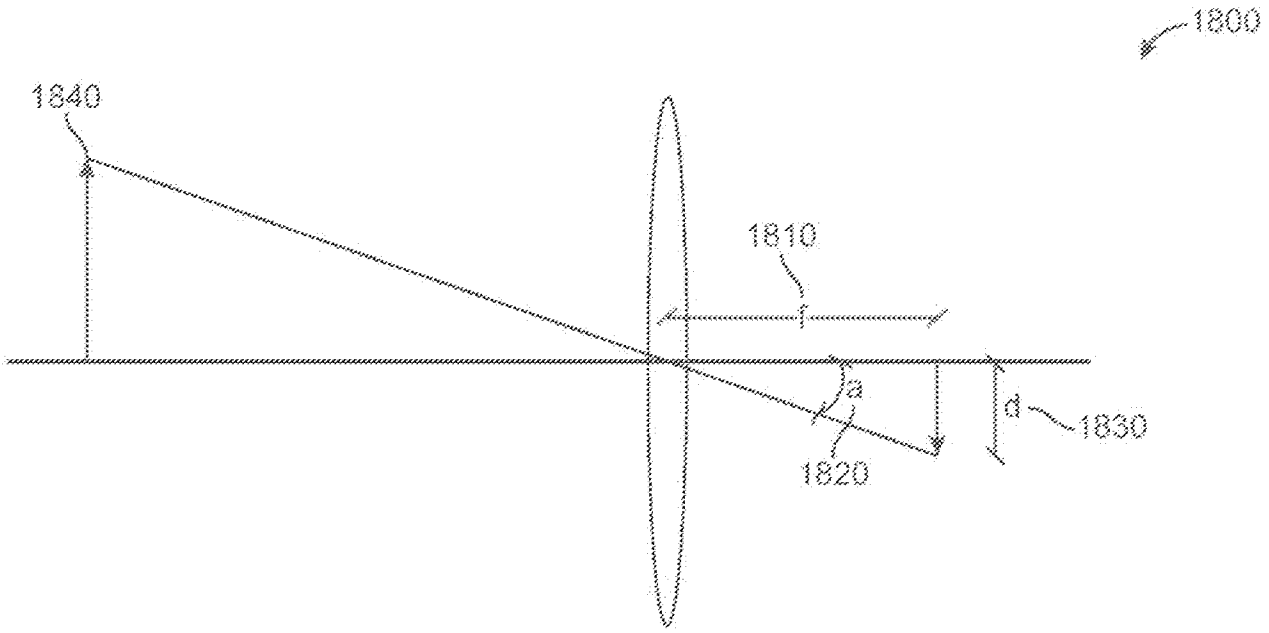
FIG. 18 shows another example determination of location of a user relative to a perpendicular from a paired device, according to an embodiment.

FIG. 18 shows another example 1800 determination of location of a user relative to a perpendicular from a paired device, according to an embodiment. In one embodiment, example 1800 shows the user position (angle) relative to the perpendicular 1840 from the face of the TV. In one embodiment, a user who is located at a distance "d" 1830 from the center of the image. The angle "a" 1820 that the user makes with the perpendicular from the face of the TV 120 is given by the simple formulae $$a=\arctan(d/f)$$

where "f" 1810 is the focal length of the TV camera 122.

Figure 19:
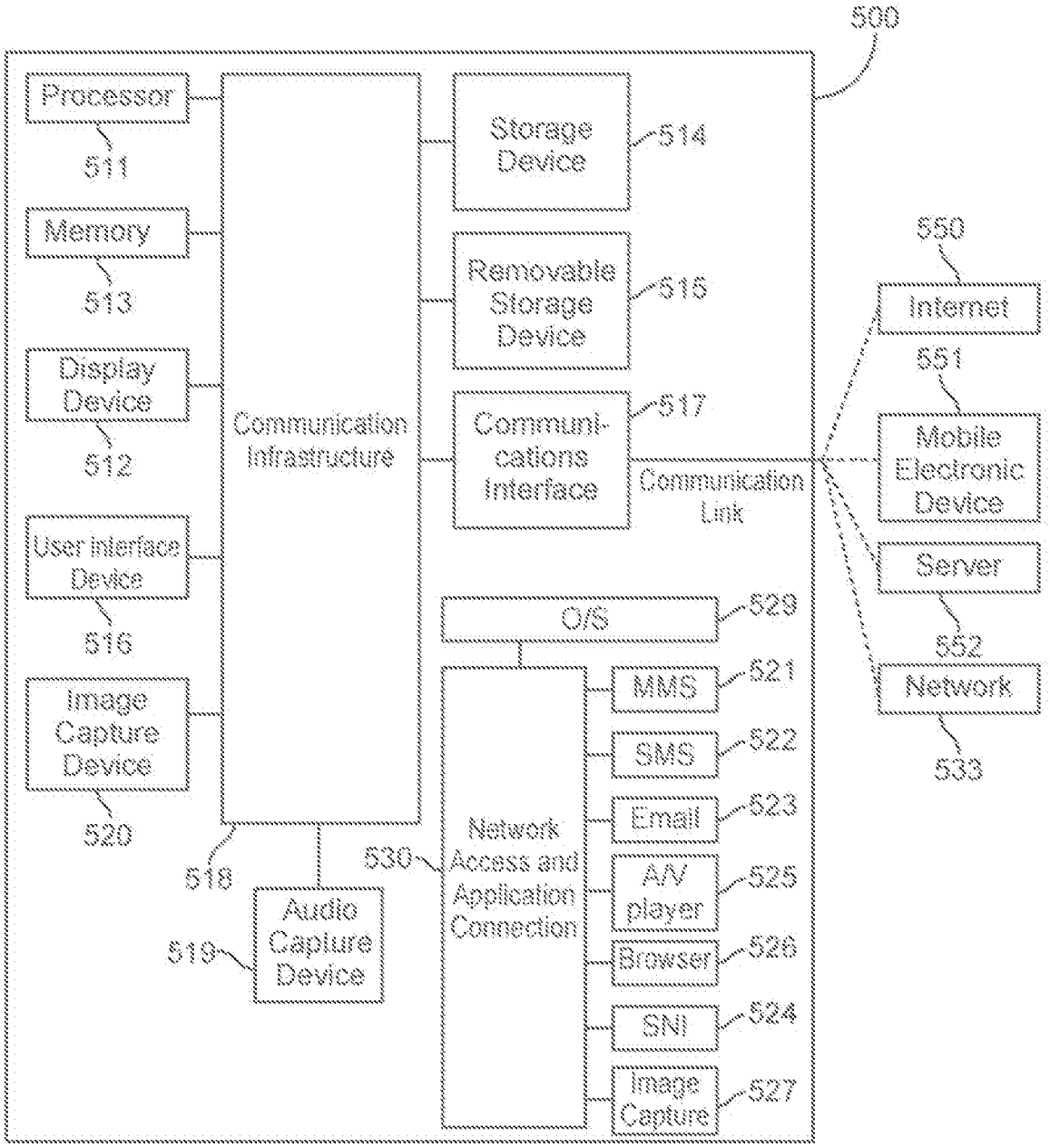
FIG. 19 is a high-level block diagram showing an information processing system comprising a computing system implementing an embodiment.

FIG. 19 is a high-level block diagram showing an information processing system comprising a computing system 500 implementing an embodiment. The system 500 includes one or more processors 511 (e.g., ASIC, CPU, etc.), and can further include an electronic display device 512 (for displaying graphics, text, and other data), a main memory 513 (e.g., random access memory (RAM)), storage device 514 (e.g., hard disk drive), removable storage device 515 (e.g., removable storage drive, removable memory module, a magnetic tape drive, optical disk drive, computer-readable medium having stored therein computer software and/or data), user interface device 516 (e.g., keyboard, touch screen, keypad, pointing device), and a communication interface 517 (e.g., modem, wireless transceiver (such as WiFi, Cellular), a network interface (such as an Ethernet card), a communications port, or a PCMCIA slot and card). The communication interface 517 allows software and data to be transferred between the computer system and external devices through the Internet 550, mobile electronic device 551, a server 552, a network 553, etc. The system 500 further includes a communications infrastructure 518 (e.g., a communications bus, cross-over bar, or network) to which the aforementioned devices/modules 511 through 517 are connected.

The information transferred via communications interface 517 may be in the form of signals such as electronic, electromagnetic, optical, or other signals capable of being received by communications interface 517, via a communication link that carries signals and may be implemented using wire or cable, fiber optics, a phone line, a cellular phone link, a radio frequency (RF) link, and/or other communication channels.

In one implementation of one or more embodiments in a mobile wireless device such as a mobile phone, the system 500 further includes an image capture device 520, such as a camera 145 (FIG. 2), and an audio capture device 519, such as a microphone. The system 500 may further include application modules as MMS module 521, SMS module 522, email module 523, social network interface (SNI) module 524, audio/video (AV) player 525, web browser 526, image capture module 527, etc.

The system 500 further includes a network access (and pairing) and application connection module 530 as described herein, according to an embodiment. In one implementation of network access and application connection processes 530 along with an operating system 529 may be implemented as executable code residing in a memory of the system 500. In another embodiment, such modules are in firmware, etc.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

Embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of one or more embodiments as discussed herein. In particular, the computer programs, when executed, enable the processor and/or multicore processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method for wirelessly [connecting] *transferring data between* a first device [with] *and* an external second device, comprising:

[wirelessly communicating between the first device and the external second device] *identifying, by the first device, the external second device*;

based on [the wireless communication] *the external second device being identified*, causing, by the first device, a dynamic graphic pattern to be displayed on a display of the external second device, the dynamic graphic pattern having a shape that changes over time;

receiving, by a camera of the first device, the dynamic graphic pattern;

recognizing, by the first device, the dynamic graphic pattern associated with the external second device; and wirelessly transferring data between the first device and the external second device based on the recognized dynamic graphic pattern.

2. The method of claim 1, wherein the dynamic graphic pattern distinguishes the external second device from other devices.

3. The method of claim 1, wherein the dynamic graphic pattern includes information associated with the external second device for wirelessly transferring data with the external second device.

4. The method of claim 1, further comprising:

launching, by the first device, an application for wirelessly [communicating] *transferring data* with the external second device.

5. The method of claim 1, wherein the data to be transferred wirelessly includes at least one of user identification (ID) information, password information, or network information to be utilized by the external second device.

6. The method of claim 1, further comprising:

storing data on the external second device based on the recognized dynamic graphic pattern.

7. The method of claim 1, wherein the dynamic graphic pattern is caused to be displayed on the external second device by an application launched on the first device.

8. A first electronic device, comprising:

a processor; and a memory storing one or more programs for execution of the processor, the one or more programs including instructions to:

[wirelessly communicate with an external second device] *identify the external second device*;

based on [the wireless communication] *the external second device being identified*, cause a dynamic graphic pattern to be displayed on a display of the external second device, the dynamic graphic pattern having a shape that changes over time;

receive, by a camera of the first electronic device, the dynamic graphic pattern;

recognize the dynamic graphic pattern associated with the external second device; and wirelessly transfer data between the first electronic device and the external second device based on the recognized dynamic graphic pattern.

9. The first electronic device of claim 8, wherein the dynamic graphic pattern distinguishes the external second device from other devices.

10. The first electronic device of claim 8, wherein the dynamic graphic pattern includes information associated with the external second device for wirelessly transferring data with the external second device.

11. The first electronic device of claim 8, wherein the one or more programs further include instructions to launch an application for wirelessly [communicating] *transferring data* with the external second device.

12. The first electronic device of claim 8, wherein the data to be transferred wirelessly includes at least one of user identification (ID) information, password information, or network information to be utilized by the external second device.

13. The first electronic device of claim 8, wherein the one or more programs further include instructions to store data on the external second device based on the recognized dynamic graphic pattern.

14. The first electronic device of claim 8, wherein the dynamic graphic pattern is caused to be displayed on the external second device by an application launched on the first device.

15. A non-transitory processor-readable medium that includes a program that when executed by a processor performs a method comprising:

[wirelessly communicating between the first device and the external second device] *identifying, by the first device, the external second device*;

based on [the wireless communication] *the external second device being identified*, causing, by the first device, a dynamic graphic pattern to be displayed on a display of the external second device, the dynamic graphic pattern having a shape that changes over time;

receiving, by a camera of the first device, the dynamic graphic pattern;

recognizing, by the first device, the dynamic graphic pattern associated with the external second device; and wirelessly transferring data between the first device and the external second device based on the recognized dynamic graphic pattern.

[16. The non-transitory processor-readable medium of claim 15, wherein the dynamic graphic pattern distinguishes the external second device from other devices, and the dynamic graphic pattern includes information associated with the external second device for wirelessly transferring data with the external second device.]

[17. The non-transitory processor-readable medium of claim 15, the method further comprising:

launching, by the first device, an application for wirelessly communicating with the external second device.]

[18. The non-transitory processor-readable medium of claim 15, wherein the data to be transferred wirelessly includes at least one of user identification (ID) information, password information, or network information to be utilized by the external second device.]

[19. The non-transitory processor-readable medium of claim 15, the method further comprising:

storing data on the external second device based on the recognized dynamic graphic pattern.]

[20. The non-transitory processor-readable medium of claim 15, wherein the dynamic graphic pattern is caused to be displayed on the external second device by an application launched on the first device.]

*21. The method of claim 1, further comprising:*

*transmitting, by the first device, a request to initiate a communication between the first device and the external second device.*

* * * * *